(12) United States Patent
Tanigami et al.

(10) Patent No.: US 12,455,264 B2
(45) Date of Patent: Oct. 28, 2025

(54) NON-TRANSITORY COMPUTER READABLE MEDIUM STORING PROGRAM FOR INSPECTING MOLDED ARTICLE REGION, METHOD FOR INSPECTING MOLDED ARTICLE REGION, AND DEVICE FOR INSPECTING MOLDED ARTICLE REGION

(71) Applicant: TEIJIN LIMITED, Osaka (JP)

(72) Inventors: Kaori Tanigami, Osaka (JP); Chio Mineo, Osaka (JP); Chihiro Imanaka, Osaka (JP); Shota Nagata, Osaka (JP)

(73) Assignee: TEIJIN LIMITED, Osaka (JP)

( * ) Notice: Subject to any disclaimer, the term of this patent is extended or adjusted under 35 U.S.C. 154(b) by 512 days.

(21) Appl. No.: 18/008,339

(22) PCT Filed: Jun. 9, 2021

(86) PCT No.: PCT/JP2021/022002
§ 371 (c)(1),
(2) Date: Dec. 5, 2022

(87) PCT Pub. No.: WO2022/009597
PCT Pub. Date: Jan. 13, 2022

(65) Prior Publication Data
US 2023/0280311 A1    Sep. 7, 2023

(30) Foreign Application Priority Data
Jul. 8, 2020    (JP) ................................. 2020-118107

(51) Int. Cl.
*G01N 29/06*    (2006.01)
*G01N 29/44*    (2006.01)

(52) U.S. Cl.
CPC ..... *G01N 29/0654* (2013.01); *G01N 29/4472* (2013.01); *G01N 29/4481* (2013.01); *G01N 2291/2698* (2013.01)

(58) Field of Classification Search
None
See application file for complete search history.

(56) References Cited

U.S. PATENT DOCUMENTS

| 10,564,108 B2 * | 2/2020 | Al-Omari | G01N 21/95 |
| 2014/0165729 A1 * | 6/2014 | Ji | G01N 29/14 |
| | | | 73/587 |

(Continued)

FOREIGN PATENT DOCUMENTS

| CN | 107428970 A | 12/2017 |
| CN | 109249627 A | 1/2019 |

(Continued)

OTHER PUBLICATIONS

English Abstract of WO2019/151393 A1 dated Aug. 8, 2019.

(Continued)

*Primary Examiner* — Walter L Lindsay, Jr.
*Assistant Examiner* — Geoffrey T Evans
(74) *Attorney, Agent, or Firm* — Sughrue Mion, PLLC

(57) ABSTRACT

An inspection device includes a storage unit for storing a mechanical property inference model generated by machine learning based on mechanical property information and nondestructive inspection information of a fiber-reinforced first molded article region for which the mechanical property information and the nondestructive inspection information are known, the mechanical property inference model being configured to be input nondestructive inspection information of a second molded article region which is reinforced with reinforcing fibers for predicting unknown mechanical property information of the second molded article region. The inspection device acquires the nondestructive inspection information of the second molded article region; inputs the nondestructive inspection information to the mechanical property inference model; acquire the mechanical property information of the second molded article region predicted by (Continued)

the mechanical property inference model; and outputs the mechanical property information of the second molded article region.

14 Claims, 17 Drawing Sheets

(56) References Cited

U.S. PATENT DOCUMENTS

| | | |
|---|---|---|
| 2017/0371980 A1 | 12/2017 | Mallapragada et al. |
| 2018/0079879 A1 | 3/2018 | Otsuki et al. |
| 2019/0047237 A1 | 2/2019 | Kamo et al. |
| 2019/0375171 A1 | 12/2019 | Choi et al. |
| 2021/0003538 A1 | 1/2021 | Toyozumi et al. |
| 2021/0035276 A1 | 2/2021 | Ago et al. |

FOREIGN PATENT DOCUMENTS

| | | |
|---|---|---|
| CN | 110286155 A | 9/2019 |
| CN | 110297041 A | 10/2019 |
| CN | 111351860 A | 6/2020 |
| JP | 2002-255664 A | 9/2002 |
| JP | 2011-251443 A | 12/2011 |
| WO | 2019/010087 A1 | 1/2019 |

OTHER PUBLICATIONS

International Search Report (PCT/ISA/210) dated Aug. 24, 2021 issued by the International Searching Authority in International Application No. PCT/JP2021/022002.

Written Opinion (PCT/ISA/237) dated Aug. 24, 2021 issued by the International Searching Authority in International Application No. PCT/JP2021/022002.

* cited by examiner

DISTRIBUTION OF IDENTIFICATION SURFACE AND REACTION VALUE WHEN RBF IS USED AS ACTIVATION FUNCTION

DISTRIBUTION OF IDENTIFICATION SURFACE AND REACTION VALUE WHEN SIGMOID FUNCTION IS USED AS ACTIVATION FUNCTION

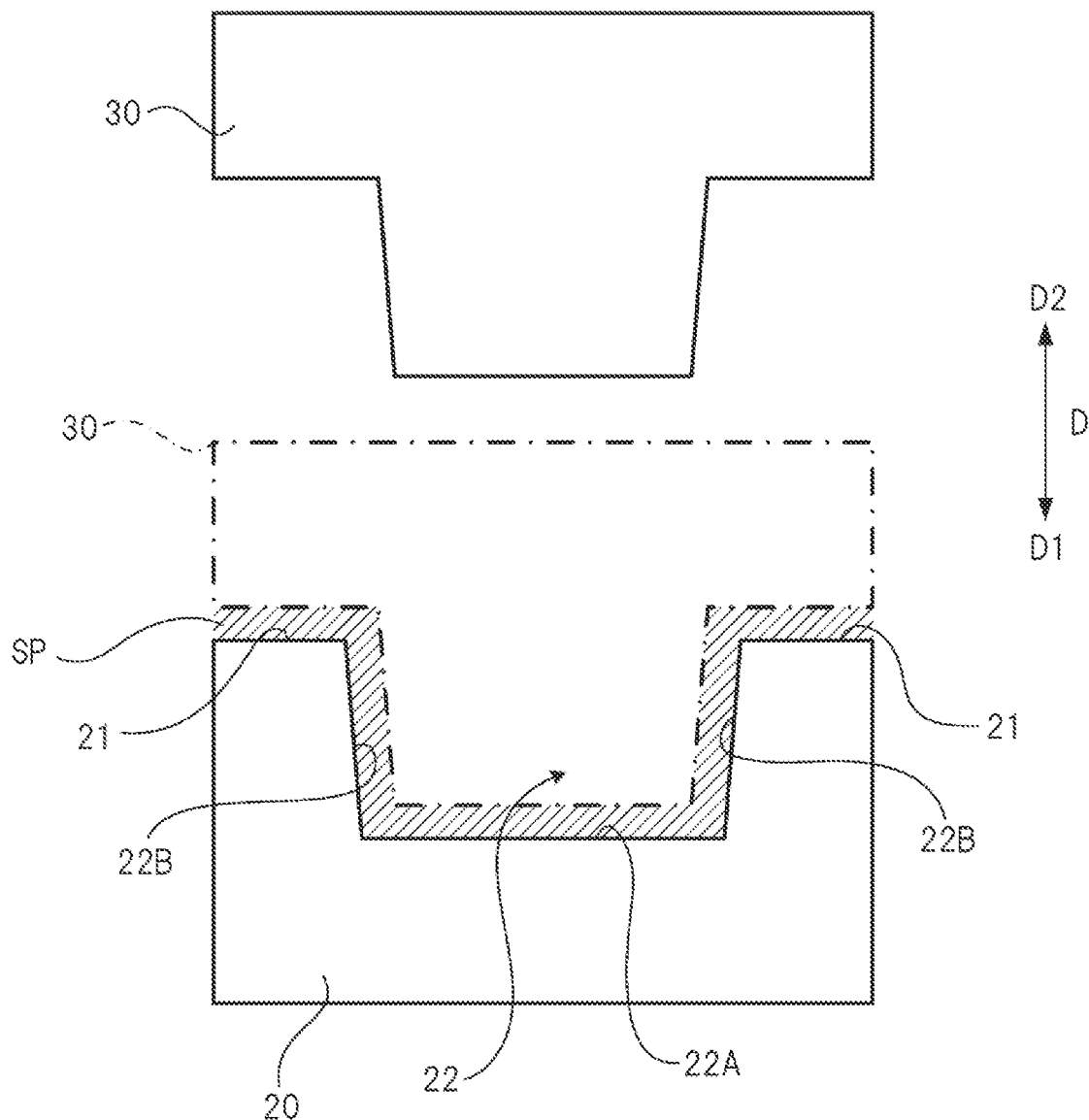

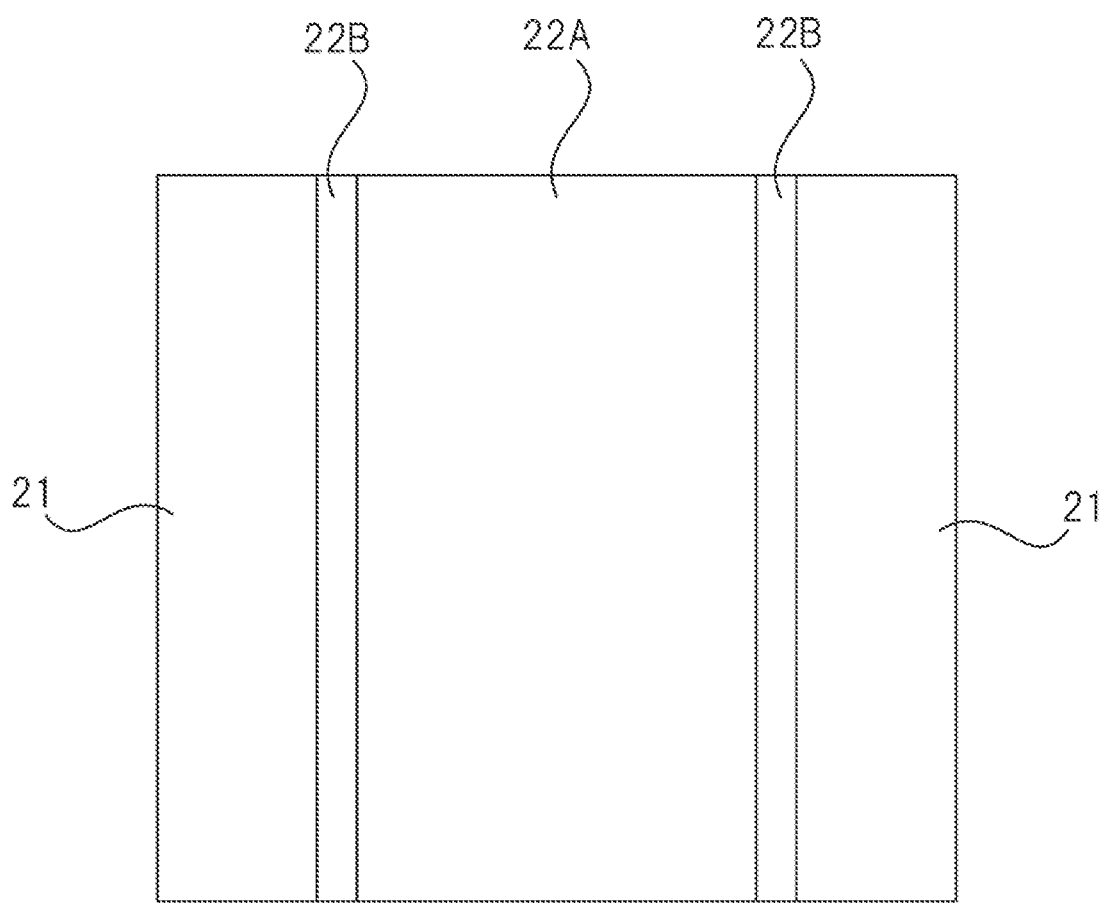

NON-TRANSITORY COMPUTER READABLE MEDIUM STORING PROGRAM FOR INSPECTING MOLDED ARTICLE REGION, METHOD FOR INSPECTING MOLDED ARTICLE REGION, AND DEVICE FOR INSPECTING MOLDED ARTICLE REGION

TECHNICAL FIELD

The present invention relates to an inspection program, an inspection method, and an inspection device for a fiber-reinforced molded article region.

BACKGROUND ART

In a molded article fiber-reinforced with carbon fibers, fragility of matrix resin can be reinforced with fibers having high strength. Therefore, it is widely used as material that is lightweight and excellent in high physical properties.

In related art, in a manufacturing process of a fiber-reinforced composite material, a nondestructive inspection for inspecting a defective product is performed during manufacturing of the composite material. For example, in Patent Literature 1, the following inspection is performed in a process of impregnating thermoplastic resin into carbon fibers. First, a directional ultrasonic wave transmitter and a directional ultrasonic wave receiver are opposed to an object to be inspected (a composite material in which the thermoplastic resin is impregnated with the carbon fibers) at a certain distance. Then, ultrasonic waves are emitted from the ultrasonic wave transmitter, pass through the object to be inspected, and then received by the opposite receiver, and a propagation time of the ultrasonic waves is measured by a signal processing circuit, thereby detecting internal defects of the object to be inspected in a non-contact manner. By converting inspection data using the ultrasonic waves into an image, it is possible to make a pass or fail judgment of the object to be inspected based on the image.

Patent Literatures 2 and 3 disclose a device that automatically performs a highly accurate search in order to efficiently sort muscle flesh and wings in a production process of processed foods.

CITATION LIST

Patent Literature

Patent Literature 1: JP2019-158459A
Patent Literature 2: WO2019/151393
Patent Literature 3: WO2019/151394

SUMMARY OF INVENTION

Technical Problem

In recent years, due to increase in raw material prices and labor costs, there is a problem to reduce production costs while maintaining high quality, and it is required to implement low-cost and high-precision inspection for a molded article region, which is a region obtained by molding a fiber-reinforced composite material with a mold (metal mold).

A sorting work of the composite material in the nondestructive inspection described in Patent Literature 1 relies on visual inspection of the obtained image. Therefore, it is difficult to recognize a state of the composite material in detail. Particularly, in the pass or fail judgment performed by visually observing the image, it is difficult to set an objective evaluation standard, and it is difficult to determine what to use to calculate a pass or fail standard of the material.

A food inspection system described in Patent Literatures 2 and 3 is a device for a human to search for a position of a hard bone, and is different from a technique for inspecting a molded article. The food inspection system merely replaces eye inspection for judging an image or quality of an object to be measured with a neural network.

An object of the present invention is to provide an inspection program, an inspection method, and an inspection device for a molded article region obtained by molding a composite material with a mold, which can infer mechanical properties of the molded article region without measuring the mechanical properties and can be useful for evaluation of the molded article region.

Solution to Problem

The above object can be achieved by each of the following aspects.

An inspection program for a molded article region according to an aspect of the present invention causes a processor to execute:
  a step of performing machine learning of mechanical property information and nondestructive inspection information of a fiber-reinforced first molded article region, and generating a mechanical property inference model in which nondestructive inspection information of a fiber-reinforced second molded article region is input for inferring unknown mechanical property information of the second molded article region;
  a step of acquiring the nondestructive inspection information of the second molded article region; and
  a step of inputting the acquired nondestructive inspection information into the mechanical property inference model, acquiring the mechanical property information of the second molded article region from the mechanical property inference model, and performing output based on the mechanical property information, wherein
  the first molded article region and the second molded article region are both obtained by molding a plate-shaped composite material with a mold, and
  the first molded article region and the second molded article region are both obtained by molding the composite material such that a charge rate is 10% or more and 500% or less,
  wherein the charge rate is a value obtained by calculating (S1/S2)×100,
  wherein S1 is a projection area of the composite material, and S2 is a projection area of a portion corresponding to each of the first molded article region and the second molded article region in a mold cavity of the mold.

An inspection method for a molded article region according to an aspect of the present invention includes:
  a step of performing machine learning of mechanical property information and nondestructive inspection information of a fiber-reinforced first molded article region, and generating a mechanical property inference model in which nondestructive inspection information of a fiber-reinforced second molded article region is input for inferring unknown mechanical property information of the second molded article region;
  a step of acquiring the nondestructive inspection information of the second molded article region; and
  a step of inputting the acquired nondestructive inspection information into the mechanical property inference model, acquiring the mechanical property information of the second molded article region from the mechanical property inference model, and performing output based on the mechanical property information, wherein the first molded article region and the second molded article region are both obtained by molding a plate-shaped composite material with a mold, and the first molded article region and the second molded article region are both obtained by molding the composite material such that a charge rate is 10% or more and 500% or less, wherein the charge rate is a value obtained by calculating (S1/S2)×100, wherein S1 is a projection area of the composite material, and S2 is a projection area of a portion corresponding to each of the first molded article region and the second molded article region in a mold cavity of the mold.

An inspection device for a molded article region according to an aspect of the present invention includes:

a processor capable of accessing a model storage unit that stores a mechanical property inference model generated by machine learning based on mechanical property information and nondestructive inspection information of a fiber-reinforced first molded article region, wherein the mechanical property inference model is configured to be input nondestructive inspection information of a second molded article region for inferring unknown mechanical property information of the second molded article region, the first molded article region and the second molded article region are both obtained by molding a plate-shaped composite material with a mold, and the first molded article region and the second molded article region are both obtained by molding the composite material such that a charge rate is 10% or more and 500% or less, wherein the charge rate is a value obtained by calculating (S1/S2)×100, wherein S1 is a projection area of the composite material, and S2 is a projection area of a portion corresponding to each of the first molded article region and the second molded article region in a mold cavity of the mold, and the processor is configured to acquire the nondestructive inspection information of the second molded article region, input the nondestructive inspection information into the mechanical property inference model, acquire the mechanical property information of the second molded article region from the mechanical property inference model, and perform output based on the mechanical property information.

Advantageous Effects of Invention

According to the present invention, it is possible to infer the mechanical properties of the molded article region only from the nondestructive inspection information without measuring the mechanical properties, and the present invention is useful for the evaluation of the molded article region. According to the present invention, it is possible to instantly infer the mechanical property information with high accuracy, which a person cannot infer from the nondestructive inspection information no matter how hard the person tries. As a result, waste loss in production of the molded article including the molded article region can be reduced, and a high-quality molded article can be provided at a low cost.

BRIEF DESCRIPTION OF DRAWINGS

FIG. 9 is a side view schematically showing an example of a mold used for press molding a composite material MX.

FIG. 10 is a schematic plan view of a fixed mold in the mold shown in FIG. 9 as viewed from a movable mold side.

DESCRIPTION OF EMBODIMENTS

Figure 1:
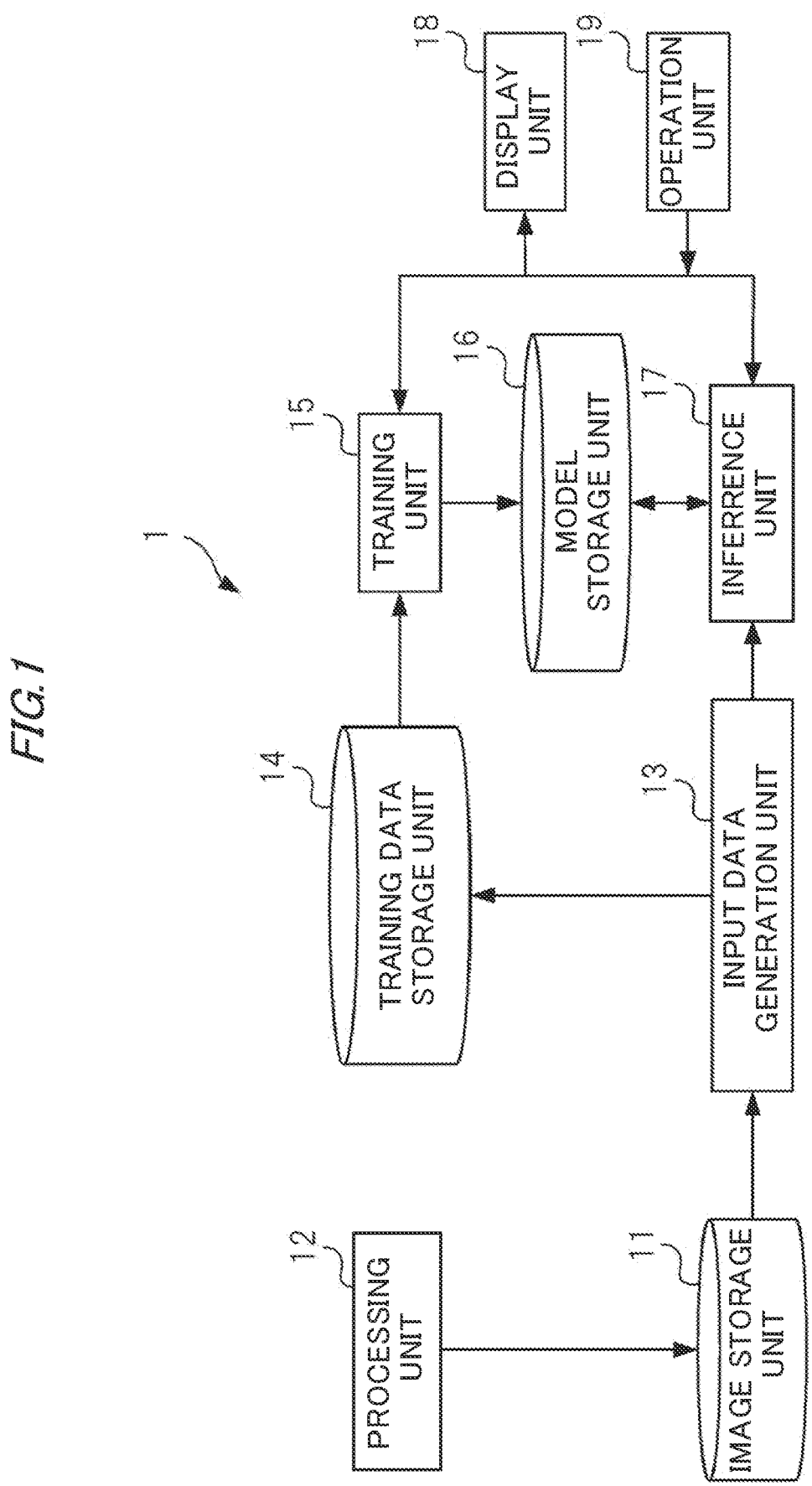
FIG. 1 is a diagram showing a configuration example of an inspection system.

Hereinafter, an inspection system including an inspection device according to an embodiment of the present invention will be described, but the present invention is not limited thereto.

[Outline of Inspection System]

In the inspection system according to the present embodiment, an object to be inspected is a molded article region (second molded article region), which is a region obtained by molding a fiber-reinforced composite material having a predetermined shape (for example, a plate shape) with a mold. The mechanical property information of the composite material is unknown. The inspection system infers the mechanical property information of the second molded article region without measuring the mechanical property.

The mechanical property information of the molded article region is information indicating mechanical properties of the molded article region, and is, for example, information on breaking or elasticity such as strength of the molded article region. Examples of the mechanical property information include information on breaking strength such as tensile strength or bending strength, and information on elastic modulus related to each of breaking strength, compressive strength, shear strength, and the like.

The information on elastic modulus may be the elastic modulus itself (for example, tensile elastic modulus or bending elastic modulus), or a rank when the elastic modulus (for example, tensile elastic modulus or bending elastic modulus) is ranked (hereinafter described as a mechanical property rank). The information on elastic modulus may further include any one kind of information indicating that the elastic modulus (or a rank thereof) corresponds to a defective product, information indicating that the elastic modulus (or a rank thereof) corresponds to a non-defective product, and information indicating that the elastic modulus (or a rank thereof) was difficult to infer.

The information on breaking strength may be the breaking strength itself (for example, tensile strength or yield strength), or a rank when the breaking strength (for example, tensile strength or yield strength) is ranked (hereinafter described as a mechanical property rank). The information on breaking strength may further include any one kind of information indicating that the breaking strength (or a rank thereof) corresponds to a defective product, information indicating that the breaking strength (or a rank thereof) corresponds to a non-defective product, and information indicating that the breaking strength (or a rank thereof) was difficult to infer.

A computer included in the inspection system acquires nondestructive inspection information of the second molded article region, inputs the nondestructive inspection information into a mechanical property inference model that is generated in advance and stored in a model storage unit, infers the mechanical property information of the second molded article region by the mechanical property inference model, and performs output of the information based on an inference result. Examples of an output method include displaying the information (for example, the mechanical property rank, the information indicating a non-defective product or a defective product, the information indicating inference difficulty, and the like) on a display unit, sending the information as a message from a speaker, and printing the information by a printer.

The nondestructive inspection information is information obtained by nondestructively inspecting an internal state of the molded article region by radiation, infrared rays, ultrasonic waves, or the like. The nondestructive inspection information may be an image of inspection using vibration or sound, or may be numerical data. In the case of an image, examples of the image include a radiation image, an infrared image, and an ultrasonic image. It should be noted that, in one embodiment described later, an ultrasonic image will be described as an example, but the present invention is not limited thereto.

The mechanical property inference model is generated by performing machine learning (including supervised or unsupervised deep learning) of known data of mechanical property information and nondestructive inspection information of a fiber-reinforced molded article region (first molded article region). The model inputs nondestructive inspection information and outputs mechanical property information. As the mechanical property inference model, for example, a neural network or a support vector machine is used.

The computer of the inspection system constitutes an inspection device. The computer includes a processor, a storage unit including a device capable of storing information, such as a hard disk device and a solid-state drive (SSD), a random-access memory (RAM), and a read-only memory (ROM). By executing an inspection program stored in the ROM, the processor acquires the nondestructive inspection information of the molded article region of the object to be inspected, inputs the acquired nondestructive inspection information to the mechanical property inference model, acquires the mechanical property information from the mechanical property inference model, performs output based on the acquired mechanical property information, and the like.

The nondestructive inspection information of the molded article region is typically used to determine if there are defects, voids, or foreign matters inside the molded article region, and if so, used to determine a degree of existence and the like. However, even if a large number of defects, voids, or foreign matters exist inside the molded article region, the mechanical properties may be good depending on a distribution state of the defects, voids, or foreign matters. In such a case, if the object to be inspected is determined to be a defective product since it is determined that there are many defects, voids, or foreign matters by visually confirming the nondestructive inspection information, the molded article region that should be a non-defective product is discarded, and production efficiency is reduced. On the other hand, the reverse is also possible. That is, even if it is determined that the object to be inspected is a non-defective product since it is determined that there are few defects, voids, or foreign matters by visually confirming the nondestructive inspection information, the mechanical properties may be in a state corresponding to a defective product.

As a result of verification based on the above viewpoints, the present inventors find that there is a correlation between the nondestructive inspection information and the mechanical property information, and succeed in inferring mechanical property information of a molded article region with high accuracy from nondestructive inspection information of the molded article region by letting a model such as a neural network or a support vector machine learn a large amount of actual measurement data of nondestructive inspection information and mechanical property information. It is not considered in the related art to obtain the mechanical property information from the nondestructive inspection information. Therefore, it is not easy for those skilled in the art to configure a machine learning model that outputs mechanical property information using nondestructive inspection information as input.

A detailed example of the inspection system will be described below. In the following, an example in which the mechanical property inference model is a neural network will be described.

[Reinforcing Fibers]

A type of the reinforcing fibers used in the present invention can be appropriately selected according to application of a molded article region (a) (corresponding to the second molded article region whose mechanical property information is unknown), which is the object to be inspected, and is not particularly limited. As the reinforcing fibers, either inorganic fibers or organic fibers can be preferably used.

Examples of the inorganic fibers include carbon fibers, activated carbon fibers, graphite fibers, glass fibers, tungsten carbide fibers, silicon carbide fibers, ceramics fibers, alumina fibers, natural mineral fibers (basalt fibers and the like), boron fibers, boron nitride fibers, boron carbide fibers, and metal fibers.

[Carbon Fibers]

When the carbon fibers are used as the reinforcing fibers, polyacrylonitrile (PAN) type carbon fibers, petroleum or coal pitch type carbon fibers, rayon type carbon fibers, cellulose type carbon fibers, lignin type carbon fibers, phenol type carbon fibers, gas phase growth type carbon fibers, and the like are generally known as the carbon fibers, but in the present invention, any of these carbon fibers can be preferably used.

[Form of Reinforcing Fibers]

In the present invention, a form of the reinforcing fibers is not particularly limited, but continuous fibers described by the present inventors as a specific example will be described below. However, the present invention is not limited to the continuous fibers.

The continuous fibers mean reinforcing fibers in which reinforcing fiber bundles are aligned in a continuous state without cutting the reinforcing fibers into short fibers. For the purpose of obtaining the molded article region (a) having excellent mechanical properties, it is preferable to use continuous reinforcing fibers. More specifically, the continuous fibers are preferably fibers having a length of 1 in or more, and can be processed into woven fabrics such as textiles and knitting and then used to impregnate a resin by hand laying or the like, or can be used as a prepreg in which an uncured resin is impregnated with the continuous fibers.

[Molded Article Region (a)]

The molded article region (a) is reinforced with the reinforcing fibers. Hereinafter, an embodiment performed by the present inventions will be described, but the present invention is not limited to the molded article region (a) described below.

1. Molded Article

The molded article region (a) is a molded article obtained by molding a plate-shaped composite material, and may be a molded article using a thermoplastic resin or a molded article using a thermosetting prepreg.

The prepreg is a material for producing a molded article, and is a molding intermediate material obtained by impregnating a thermosetting resin with a base material made of carbon fibers such as a sheet of continuous carbon fibers arranged in one direction or carbon fiber woven fabrics, or by impregnating a part of the thermosetting resin and arranging the remaining part on at least one surface.

2. Unidirectional Material

The molded article region (a) is preferably a unidirectional material. The unidirectional material refers to a material in which continuous reinforcing fibers having a length of 100 mm or more are aligned in one direction inside the molded article region (a). As the unidirectional material, a material obtained by laminating plural continuous reinforcing fibers may be used. Particularly, when the molded article region (a) is a unidirectional material and is a molded article using a thermosetting prepreg, influence of fiber orientation on the mechanical properties is small. Therefore, it is possible to improve inference accuracy of the mechanical property information by a model described later.

[Preferred Molded Article Region]

It is preferable that the molded article region contains reinforcing fibers and a matrix resin as essential components, and other components as optional components, and a porosity Vr of the molded article region calculated by the following Equations (A) and (B) is preferably 10% or less.

$$Vr = (t2-t1)/t2 \times 100 \qquad \text{Equation (A)}$$

$$t1 = (Wf/Df + Wm/Dm + Wz/Dz)/\text{unit area}(mm^2) \qquad \text{Equation (B)}$$

t1: theoretical thickness of molded article region (mm)
t2: measured thickness of molded article region (mm)
Df: reinforcing fiber density ($mg/mm^2$)
Dm: matrix resin density ($mg/mm^3$)
Dz: density of other components ($mg/mm^3$)
Wf: mass ratio of reinforcing fibers (%)
Wm: mass ratio of matrix resin (%)
Wz: mass ratio of other components (%)

The porosity Vr is more preferably 5% or less, and even more preferably 3% or less. When the porosity is within the range, the inference accuracy of the mechanical properties of the present invention is improved.

[Production of Molded Article Region (a)]

For example, the molded article region (a) can be prepared as follows.

1. Materials

Reinforcing fibers: carbon fibers "Tenax (registered trademark)" STS40-24K (tensile strength: 4300 MPa, tensile elastic modulus: 240 GPa, number of filaments: 24000, fineness: 1600 tex, elongation: 0.8%, density: $1.78/cm^3$, made by Teijin Limited)

Base resin: a thermosetting resin composition containing epoxy resin as a main component 2. Production of Unidirectional Prepreg The unidirectional prepreg was prepared by a hot melt method as follows. First, the thermosetting resin composition was applied onto a release paper using a coater to prepare a resin film. Next, the carbon fiber bundles are sent out from a creel and passed through a comb, then passed through an opening bar to increase a width thereof after pitches between the carbon fiber bundles are matched with each other, and then arranged in one direction so as to form a sheet having a fiber basis weight of 100 $g/m^2$ per unit area. Then, the resin film was laminated from both sides of the carbon fibers, heated and pressed to impregnate the thermosetting resin composition, and wound with a winder to prepare the unidirectional prepreg. A resin content of the obtained unidirectional prepreg was 30 wt %.

3. Production of Molded Article Region (a)

The unidirectional prepregs were manually laminated for 11 layers in a direction of 0° to form a prepreg laminate having a laminated structure $[011]_T$. The prepreg laminate was placed in a bag film and then placed in a mold, heated in an autoclave at 130° C. for 120 minutes, and cured to produce a CFRP molded article having a thickness of 1 mm (the molded article region (a), which is a unidirectional carbon fiber-reinforced thermosetting resin molded article). A charge rate described below during autoclave molding was 100%.

[Measurement of Tensile Elastic Modulus and Tensile Strength]

As a specific example of the breaking strength or the elastic modulus of the present invention, the present inventors measured the tensile elastic modulus and the tensile strength of the molded article region (a) as described below.

The CFRP molded article was processed into a test piece shape (length 250 mm×width 15 mm) by a water jet, and adhered to a tab made of a glass fiber-reinforced resin-based composite material. In accordance with an ASTMD 3039 method, a tensile test was performed in a direction of 0° at a test speed of 2 mm/min using a universal testing machine, so that the tensile elastic modulus and the tensile strength of the CFRP molded article (molded article region (a)) were calculated.

[Nondestructive Inspection Information]

A nondestructive inspection method used to generate the nondestructive inspection information is not particularly limited as long as it is an inspection method that detects internal defects, voids, or foreign matters in the molded article region (a) without destroying the molded article region (a). Radiation, ultrasonic waves, infrared rays, or the like are used for the nondestructive inspection. An image converted from inspection data is preferably used as the nondestructive inspection information, and it is particularly preferable that the converted image is an ultrasonic flaw detection inspection image. It may be an image of inspection using vibration or sound. A method for imaging the inspection data is not particularly limited. In many cases, in purchase of an ultrasonic inspection device, imaging software is also provided along with a computer terminal for data processing.

[Ultrasonic Flaw Detection Inspection Image]

In general, a typical nondestructive inspection method for a material is an inspection method using ultrasonic waves. A directional ultrasonic wave transmitter and a directional ultrasonic wave receiver are opposed to each other on two sides of the molded article region (a), which is the object to be inspected, at a certain distance, respectively. Pulse-modulated ultrasonic waves are emitted from the transmitter and received by the opposite receiver, and a propagation time (echo intensity) of the ultrasonic waves is measured by a signal processing circuit. When the molded article region (a), which is the object to be inspected, contains voids or foreign matters, the propagation time changes. Therefore, an internal state of the molded article region (a) can be detected by the ultrasonic waves in a non-contact manner.

Next, a specific example of a method for acquiring the ultrasonic flaw detection inspection image as the nondestructive inspection information will be described. Here, the CFRP molded article as the molded article region (a) is measured using an ultrasonic flaw detector (SDS-3600: manufactured by Nippon Clout Kramer Co., Ltd), and an ultrasonic flaw detection inspection image for evaluating internal defects of the CFRP molded article is obtained.

More specifically, the molded article region (a), which is the object to be inspected, is subjected to ultrasonic inspection using ultrasonic waves having a frequency of 600 kHz after be arranged with ultrasonic probes. A transmitting probe is 30 mm vertically from an upper surface of the object to be inspected, and a receiving probe is 30 mm vertically away from a lower surface of the object to be inspected, and the two probes are arranged so that a shaft portion of the receiving probe is positioned in a vertical direction from a shaft portion of the transmitting probe.

To image an electrical signal converted from the ultrasonic waves received by the receiving probe, a received echo intensity at a certain depth in the ultrasonic probe is brightness-modulated and the C-scan was used in which a position (two-dimensional) on the object to be inspected was displayed as the Cartesian coordinates. In an obtained C-scan image, a difference in propagation behavior of the ultrasonic waves is shown by differences in color and shade.

The specifically obtained C-scan images are shown in FIGS. 8A to 8D. Colors of the C-scan images shown in FIGS. 8A to 8D can be changed according to the propagation behavior of the ultrasonic waves and the echo intensity, but images used for learning described below and images used for inferring the mechanical property information of the object to be inspected shall all be acquired under the same conditions.

[Inspection System]

In the following, data converted into a format that can be input to an input layer of the neural network will be referred to as input data. In the inspection system, nondestructive inspection information (hereinafter referred to as nondestructive inspection information sample) of a sample of the molded article region (a) (hereinafter referred to as a molded article region sample (b), corresponding to the first molded article region) and mechanical property information (hereinafter referred to as mechanical property information sample) actually measured from the molded article region sample (b) is acquired and used as second input data, and learning of the neural network is performed using the second input data. When the training of the neural network is completed, the nondestructive inspection information of the molded article region (a) is input to the neural network as first input data, and the mechanical property information of the molded article region (a) is predicted based on a reaction value in an output layer from the neural network. Based on the predicted mechanical property information, the molded article region (a) may be classified into a non-defective product or a defective product.

Since the inspection system performs effective training and highly accurate inference, nondestructive inspection information (preferably ultrasonic flaw detection image) optimized for training process and inference process can be used. For example, various image processing may be performed on the ultrasonic flaw detection image so that the ultrasonic flaw detection image can be easily detected.

[Inspection Device]

An inspection device 1 performs image processing, generation of the input data, the training of the neural network, inference of the mechanical property information using the neural network, and the like. The inspection device 1 is an information processing device such as a computer that includes one or plural processors including a central processing unit (CPU) and the like, a storage unit, and a communication unit, and runs an operating system (OS) and an application. The inspection device 1 may be a physical computer, or may be implemented by a virtual machine (VM), a container, or a combination thereof. More specifically, a structure of the processor is an electric circuit in which circuit elements such as semiconductor elements are combined.

The inspection device 1 includes an image storage unit 11 that stores the nondestructive inspection information and the nondestructive inspection information sample, a processing unit 12 that processes the nondestructive inspection information and the nondestructive inspection information sample, and an input data generation unit 13, a training data storage unit 14, a training unit 15, a model storage unit 16, an inference unit 17, a display unit 18, and an operation unit 19. Each of the processing unit 12, the input data generation unit 13, the training unit 15, and the inference unit 17 is a functional block implemented by the processor of the inspection device 1 executing a program. The program includes an inspection program for the molded article region.

The image storage unit 11 is preferably a storage area for storing the ultrasonic flaw detection image. The image storage unit 11 may be a volatile memory such as SRAM and DRAM, or a non-volatile memory such as NAND, MRAM, and FRAM (registered trademark).

The processing unit 12 preferably performs image processing on the ultrasonic flaw detection image, and stores an image after the image processing in the image storage unit 11. Examples of the image processing include generation of an image in which brightness of each color of red, green, and blue (RGB) in pixels in an image is extracted, generation of an image in which brightness of green (G) is subtracted from brightness of red (R) in each pixel, and generation of an image in which only a red component is extracted after conversion to an HSV color space, but other types of image processing may be performed.

The processing unit 12 may also perform image enlargement, reduction, cropping, noise reduction, rotation, inversion, color depth change, contrast adjustment, brightness adjustment, sharpness adjustment, color correction, and the like.

The input data generation unit 13 generates the input data to be input to the input layer of the neural network from the nondestructive inspection information or the nondestructive inspection information sample stored in the image storage unit 11. For example, when performing the training described later using the ultrasonic flaw detection image, it is preferable to cut out a desired portion from the ultrasonic flaw detection image or remove excess portions to obtain the second input data.

When the inspection device 1 executes the training process, the input data generation unit 13 stores the input data in the training data storage unit 14. When the inspection device 1 inspects the molded article region (a), the input data is sent to the inference unit 17.

When performing the training process, the input data generation unit 13 may generate the input data using, for example, an image (nondestructive inspection information sample) taken by an external device or system.

The training data storage unit 14 is a storage area for storing plural pieces of the input data used for the training of the neural network. The input data stored in the training data storage unit 14 is used as training data of the training unit 15. The input data (second input data) used as the training data is stored in association with the mechanical property information sample obtained by measuring from the molded article region sample (b), which is an acquisition source of the input data. In the mechanical property information sample, in addition to at least one of a mechanical property rank and a mechanical property value (for example, elastic modulus) of the molded article region sample (b), information indicating that the mechanical property value corresponds to a non-defective product, information indicating that the mechanical property value corresponds to a defective product, information indicating that it is difficult to predict the mechanical property value, and the like may also be included.

For example, association of the mechanical property information sample to the second input data obtained from the molded article region sample (b) (hereinafter, this association is also referred to as labeling) can be performed by directly inputting the mechanical property value (for example, elastic modulus) of the molded article region sample (b) by the user operating the operation unit 19. After the input, the inspection device 1 classifies the mechanical property values into the mechanical property rank. For example, the tensile elastic modulus can be classified into the following mechanical property rank.

Mechanical property rank 1: the tensile elastic modulus of the molded article region is 30 GPa or more
Mechanical property rank 2: the tensile elastic modulus of the molded article region is 25 to 30 GPa
Mechanical property rank 3: the tensile elastic modulus in the molded article region is 25 GPa or less The mechanical property rank may be output in a unit of 3 GPa or 1 GPa instead of 5 GPa as described above. It should be noted that if the mechanical property information sample corresponding to the second input data obtained from the molded article region sample (b) is known, the mechanical property rank may be automatically labeled by a program or a script instead of user operation. The labeling of the mechanical property rank may be performed before the conversion of the nondestructive inspection information sample obtained from the molded article region sample (b) to the second input data, or after the conversion to the second input data.

The training unit 15 performs the training of the neural network using the input data (second input data) stored in the training data storage unit 14. The training unit 15 stores the neural network after training in the model storage unit 16. The training unit 15 can perform training of a neural network having three layers, for example, an input layer, a hidden layer, and an output layer. By making the three-layer neural network learn, real-time response performance during inspection of the molded article region (a) can be ensured. The number of units included in each of the input layer, the hidden layer, and the output layer is not particularly limited. The number of units included in each layer can be determined based on required response performance, inference target, identification performance, and the like.

The three-layer neural network is merely an example, and a multi-layer neural network having a larger number of layers may also be used. When using a multi-layer neural network, various neural networks such as a convolutional neural network can be used.

The model storage unit 16 is a storage area for storing the neural network that is made to learn by the training unit 15. Plural neural networks may be stored in the model storage unit 16 according to a type of the molded article region (a), which is the object to be inspected. Since the model storage unit 16 is set so that it can be referred to by the inference unit 17, the inference unit 17 can inspect the molded article region (a) (predict the mechanical property information) using the neural network stored in the model storage unit 16. The model storage unit 16 may be a volatile memory such as RAM and DRAM, or a non-volatile memory such as NAND, MRAM, and FRAM (registered trademark). The model storage unit 16 may be located in a location accessible from the processor of the inspection device 1, and may not be built in the inspection device 1. For example, the model storage unit 16 may be a storage externally attached to the inspection device 1 or a network storage connected to a network accessible from the inspection device 1.

The inference unit 17 predicts the mechanical property information of the molded article region (a) by using the neural network stored in the model storage unit 16. The inference unit 17 predicts the mechanical property rank of the molded article region (a) based on the reaction value output from a unit of the output layer. Examples of the unit of the output layer include a mechanical property rank 1 unit, a mechanical property rank 2 unit, a mechanical property rank 3 unit, and a hard-to-predict unit, but other types of units may also be prepared. For example, there is a possibility that a large amount of foreign matters and the like are mixed in a product whose mechanical property rank is predicted to be low. The mechanical property rank of the molded article region (a) may also be predicted by using a difference or a ratio of reaction values of plural units.

The display unit 18 is a display for displaying an image or text. The display unit 18 may display the captured image, the image after the image processing, and a inference result by the inference unit 17.

The operation unit 19 is a device that provides a method for a user to operate the inspection device 1. The operation unit 19 is, for example, a keyboard, a mouse, a button, a switch, a voice recognition device, or the like, but is not limited thereto.

[Training Process]

Figure 2:
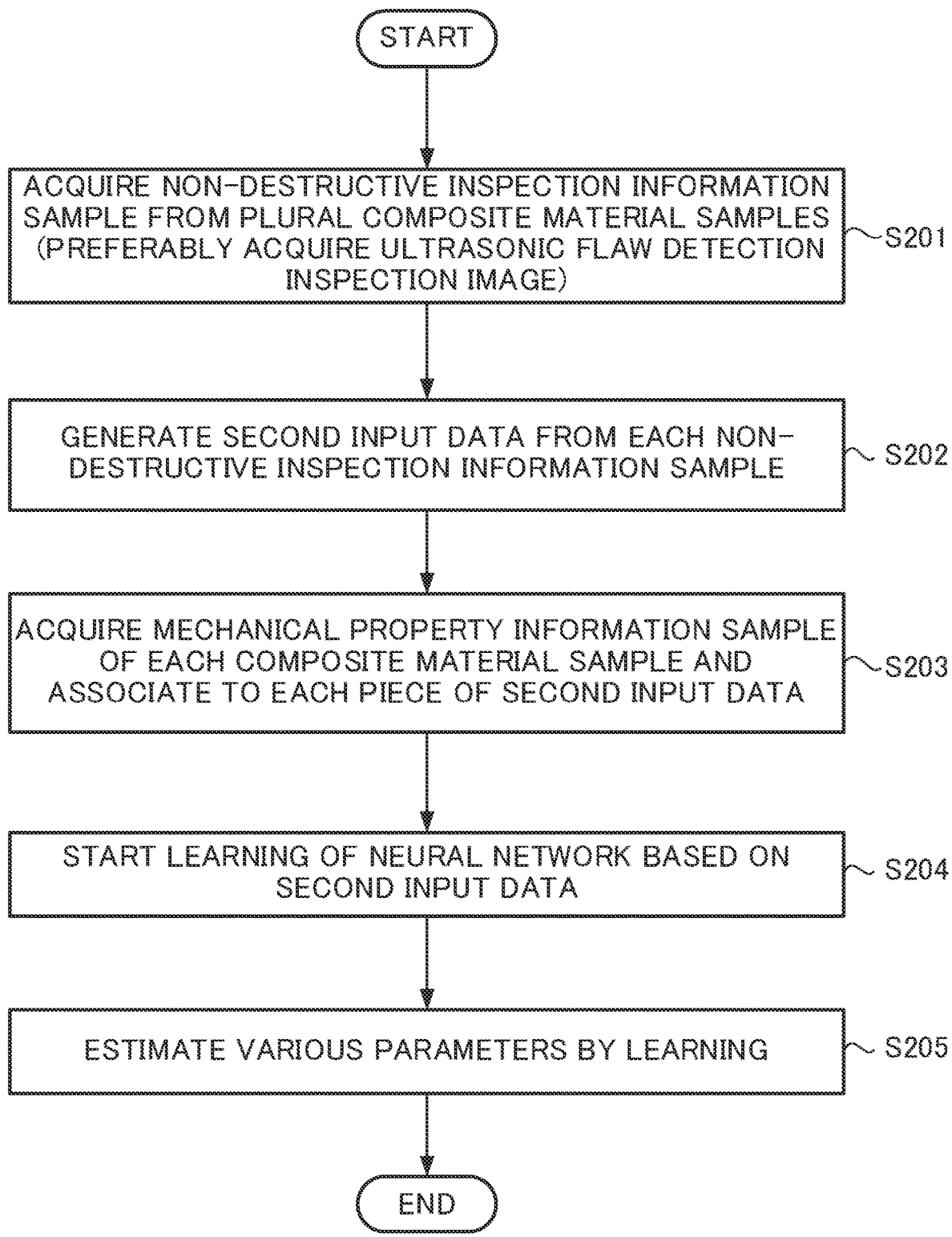
FIG. 2 is a flow chart of training process.

Before inferring the mechanical property rank of the molded article region (a) by the inspection device 1, the training of the neural network must be performed using the nondestructive inspection information sample and the mechanical property information sample of the molded article region sample (b) of the same type as the molded article region (a). FIG. 2 is a flowchart of the training process.

First, the processor of the inspection device 1 acquires each nondestructive inspection information sample of plural molded article region samples b (step S201). The nondestructive inspection information sample here includes those having a high or low mechanical property rank. When a unit for outputting a reaction value indicating that inference is difficult is provided in the output layer of the neural network, samples of nondestructive inspection information whose mechanical property information is difficult to predict may be prepared. Examples of the samples of nondestructive inspection information whose mechanical property information is difficult to predict include: an image in which the molded article region sample (b) is not sufficiently shown when the nondestructive inspection information sample is an image: and an image in which the molded article region sample (b) is not clearly shown due to improper brightness adjustment by illumination or exposure.

The processor of the inspection device 1 generates the second input data from each acquired nondestructive inspection information sample (step S201). Next, the processor of the inspection device 1 acquires each mechanical property information sample of the plurality of molded article region samples b, and stores the acquired mechanical property information sample in association with each piece of the second input data (step S203).

The step S203 may also be performed before the step S202. In this case, even after each nondestructive inspection information sample is converted to the second input data, the mechanical property information sample associated with the nondestructive inspection information sample shall be taken over by the second input data.

Next, the processor of the inspection device 1 causes the neural network to learn based on the second input data (step S204).

Figure 3:
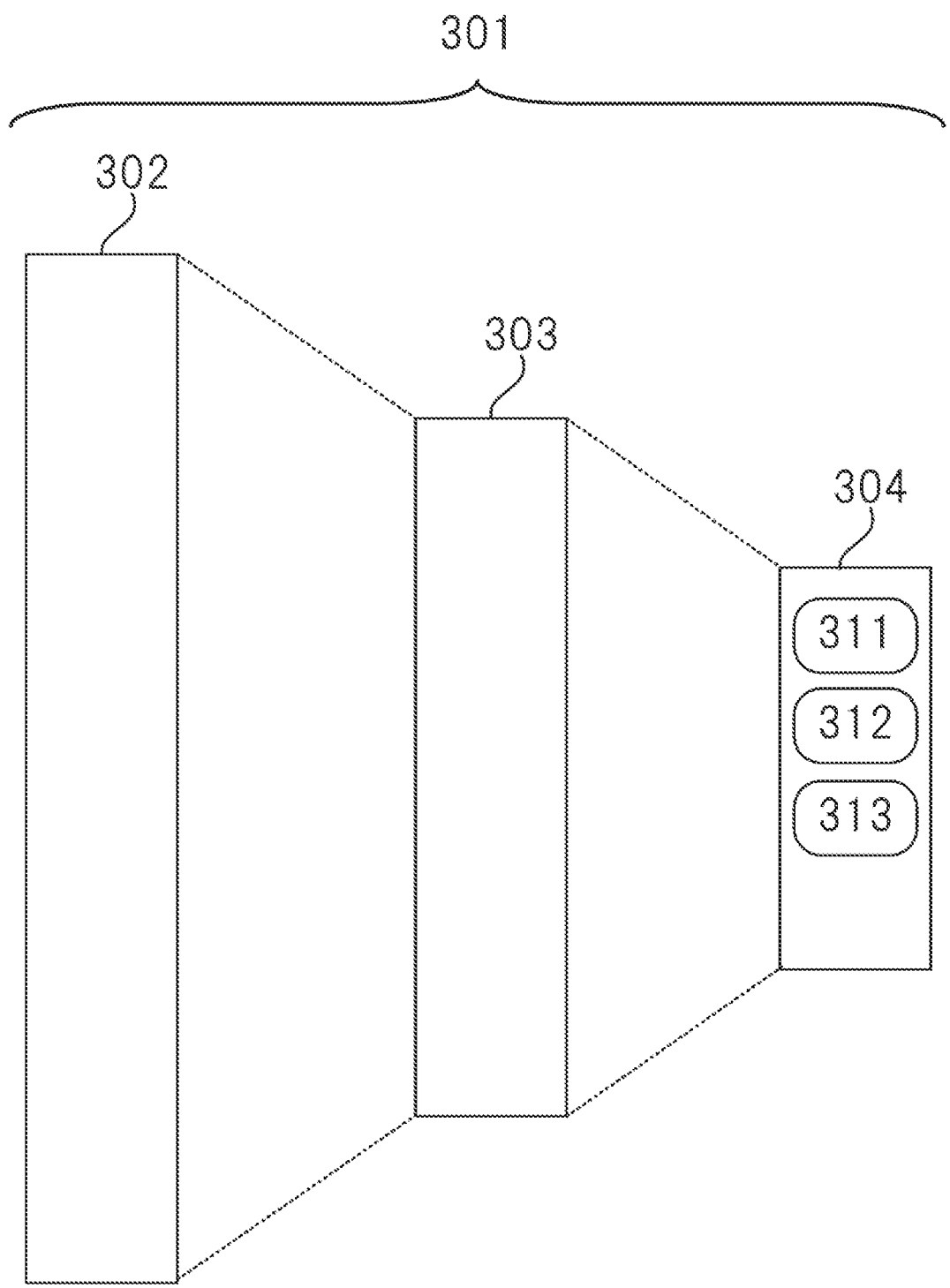
FIG. 3 is a diagram showing an example of a neural network that outputs three reaction values.

FIG. 3 shows an example of a neural network that outputs three reaction values. A neural network 301 in FIG. 3 is a neural network having three layers, an input layer 302, a hidden layer 303, and an output layer 304. The output layer 304 includes units 311, 312, 313 for inferring the mechanical property rank. There are three units 311, 311, 313 shown in FIG. 3, but the number of units can be increased or decreased as appropriate according to ranks of the mechanical properties.

In the neural network, a value input to the input layer is propagated to the hidden layer and the output layer, so as to obtain the reaction value of the output layer. In the step S204, each parameter and configuration of the neural network is adjusted, such as the number of the hidden layer 303, the number of units included in each of the input layer 302 and the hidden layer 303, and a bond coefficient between the units included in each of the input layer 302 and the hidden layer 303, so that the mechanical property information sample associated with the second input data or information close to that is output from the neural network with high probability when the second input data is input to the neural network. In this way, the mechanical property inference model is generated and stored in the model storage unit 16.

Figure 4:
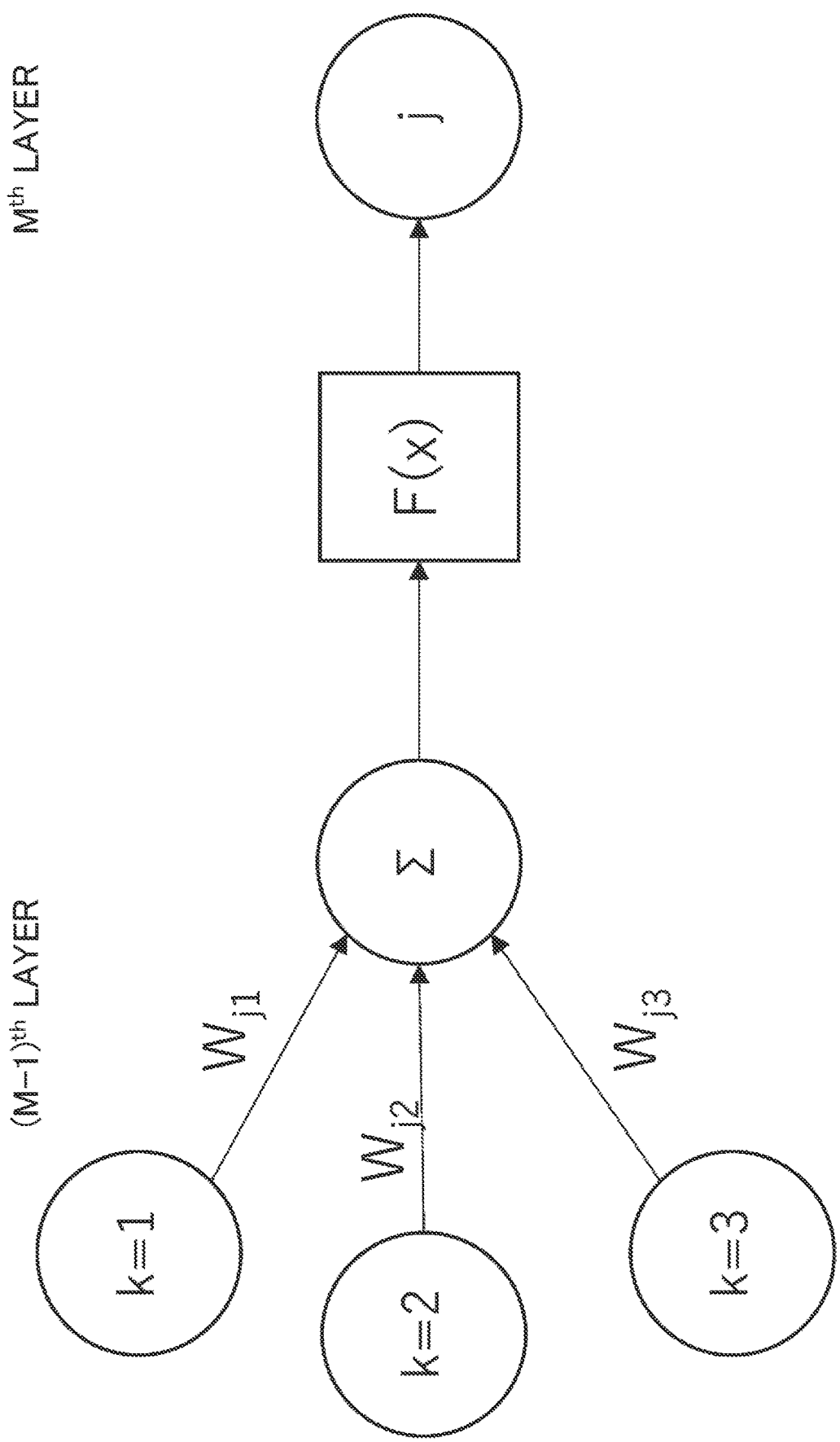
FIG. 4 is a diagram showing arithmetic process between units of the neural network.

FIG. 4 shows arithmetic processing between the units of the neural network. In FIG. 4, units in an $(m-1)^{th}$ layer and units in an $m^{th}$ layer are shown. For illustration purposes, only some units in the neural network are shown in FIG. 4. The unit number of the $(m-1)^{th}$ layer is k=1, 2, 3, . . . . The unit number of the $m^{th}$ layer is j=1, 2, 3, . . . .

Assuming that a reaction value of the unit number k of the $(m-1)^{th}$ layer is $a_k^{m-1}$, a reaction value $a_j^m$ of the unit number j of the $m^{th}$ layer is calculated using the following Equation (2).

$$a_j^m = f\left(\sum_k W_{jk}^m a_k^{m-1} + b_j^m\right) \qquad (2)$$

Here, $W_{jk}^m$ is a weight, which indicates a strength of bond between the units, $b_j^m$ is a bias, and f( . . . ) is an activation function. According to Equation (2), it can be understood that the reaction value of any unit in the $m^{th}$ layer is an output value when the reaction values of all the units (k=1, 2, 3 . . . ) in the $(m-1)^{th}$ layer are weighted and added up and input as a variable of the activation function.

Next, an example of the activation function will be described. The following Equation (3) is a normal distribution function.

$$f(x) = \frac{1}{\sqrt{2\pi\sigma}} \exp\left\{-\frac{(x-\mu)^2}{2\sigma^2}\right\} \qquad (3)$$

Here, μ is an average value, which indicates a position of a center of a bell-shaped peak drawn by the normal distribution function, and c is a standard deviation, which indicates a peak width. Since a value of Equation (3) depends only on a distance from the center of the peak, it can be said that the Gaussian function (normal distribution function) is a kind of radial basis function (RBF). The Gaussian function (normal distribution function) is merely an example, and other RBFs may also be used.

The following Equation (4) is a sigmoid function. The sigmoid function asymptotically approaches 1.0 at a limit of x→∞. In addition, it asymptotically approaches 0.0 at a limit of x→∞. That is, the sigmoid function takes values in a range of (0.0, 1.0).

$$f(x) = \frac{1}{1 + \exp(-x)} \qquad (4)$$

Functions other than the Gaussian function and the sigmoid function may also be used as the activation function. For example, the present inventors used ReLU for a convolutional layer and softmax for the output layer.

In the training of the neural network, the weight $W_{jk}$, which is the strength of bond between units, is adjusted so that a correct output can be obtained after the input data is input to the input layer. The correct output (a reaction value of a unit in the output layer), which is expected when the input data labeled with a certain mechanical property rank is input to the neural network, is also called a teacher signal.

For example, after inputting the input data labeled with the mechanical property rank of 311 into the neural network 301, in the teacher signal, the reaction value of the unit 311 is 1, the reaction value of the unit 312 is 0, and the reaction value of the unit 313 is 0. After inputting the input data labeled with the mechanical property rank of 312 into the neural network 301, in the teacher signal, the reaction value of the unit 311 is 0, the reaction value of the unit 312 is 1, and the reaction value of the unit 313 is 0.

For example, the weight $W_{jk}$ can be adjusted using a back propagation method. In the back propagation method, the weight $W_{jk}$ is adjusted in order from the output layer side so that a deviation between the output of the neural network 3170 and the teacher signal becomes small. The following Equation (5) shows an improved back propagation method.

$$W_{jk}(t+1) = W_{jk}(t) + \Delta W_{jk}(t)$$

$$\Delta W_{jk}(t) = -\eta \delta_k O_j + \alpha \Delta W_{jk}(t-1) + \beta \Delta W_{jk}(t-2) \quad (5)$$

When the Gaussian function is used as the activation function, not only the weight $W_{jk}$, the $\sigma$ and $\mu$ in Equation (3) are also adjusted as parameters in the improved back propagation method. By adjusting values of the parameters $\sigma$ and $\mu$, learning convergence of the neural network is assisted. The following Equation (6) shows value adjustment process performed for the parameter $\sigma$.

$$\sigma_{jk}(t+1) = \sigma_{jk}(t) + \Delta \sigma_{jk}(t)$$

$$\Delta \sigma_{jk}(t) = -\eta \delta_k O_j + \alpha \Delta \sigma_{jk}(t-1) + \beta \Delta \sigma_{jk}(t-2) \quad (6)$$

The following Equation (7) shows value adjustment process performed for the parameter $\mu$.

[Eq. 6]

$$\mu_{jk}(t+1) = \mu_{jk}(t) + \Delta \mu_{jk}(t)$$

$$\Delta \mu_{jk}(t) = -\eta \delta_k O_j + \alpha \Delta \mu_{jk}(t-1) + \beta \Delta \mu_{jk}(t-2) \quad (7)$$

Here, t is the number of trainings, $\eta$ is a training constant, $\delta_k$ is a generalization error, $O_j$ is a reaction value of the unit number j, $\alpha$ is a sensitivity constant, and $\beta$ is a vibration constant. $\Delta W_{jk}$, $\Delta \sigma^{jk}$, $\Delta \mu_{jk}$ indicate correction amounts of the weight $W_{jk}$, $\sigma$, and $\mu$, respectively.

Here, the adjustment process for the weight $W_{jk}$ and the parameters is explained using the improved back propagation method as an example, but a general back propagation method may also be used. In the following, when the term "back propagation method" is simply used, the improved back propagation method and the general back propagation method are both included.

The number of adjustments for the weight $W_{jk}$ and the parameters by the back propagation method may be once or multiple times, and is not particularly limited. In general, whether to repeatedly adjust the weight $W_{jk}$ and the parameters by the back propagation method can be determined based on inference accuracy of the mechanical property rank when using test data. When repeatedly adjusting the weight $W_{jk}$ and the parameters, the inference accuracy of the mechanical property rank may be improved.

By using the above method, the value of the weight $W_{jk}$ and the parameters $\sigma$, $\mu$ can be determined in the step S204. When the values of the weight $W_{jk}$ and the parameters $\sigma$, $\mu$ are determined, the inference process using the neural network can be performed.

Figure 5:
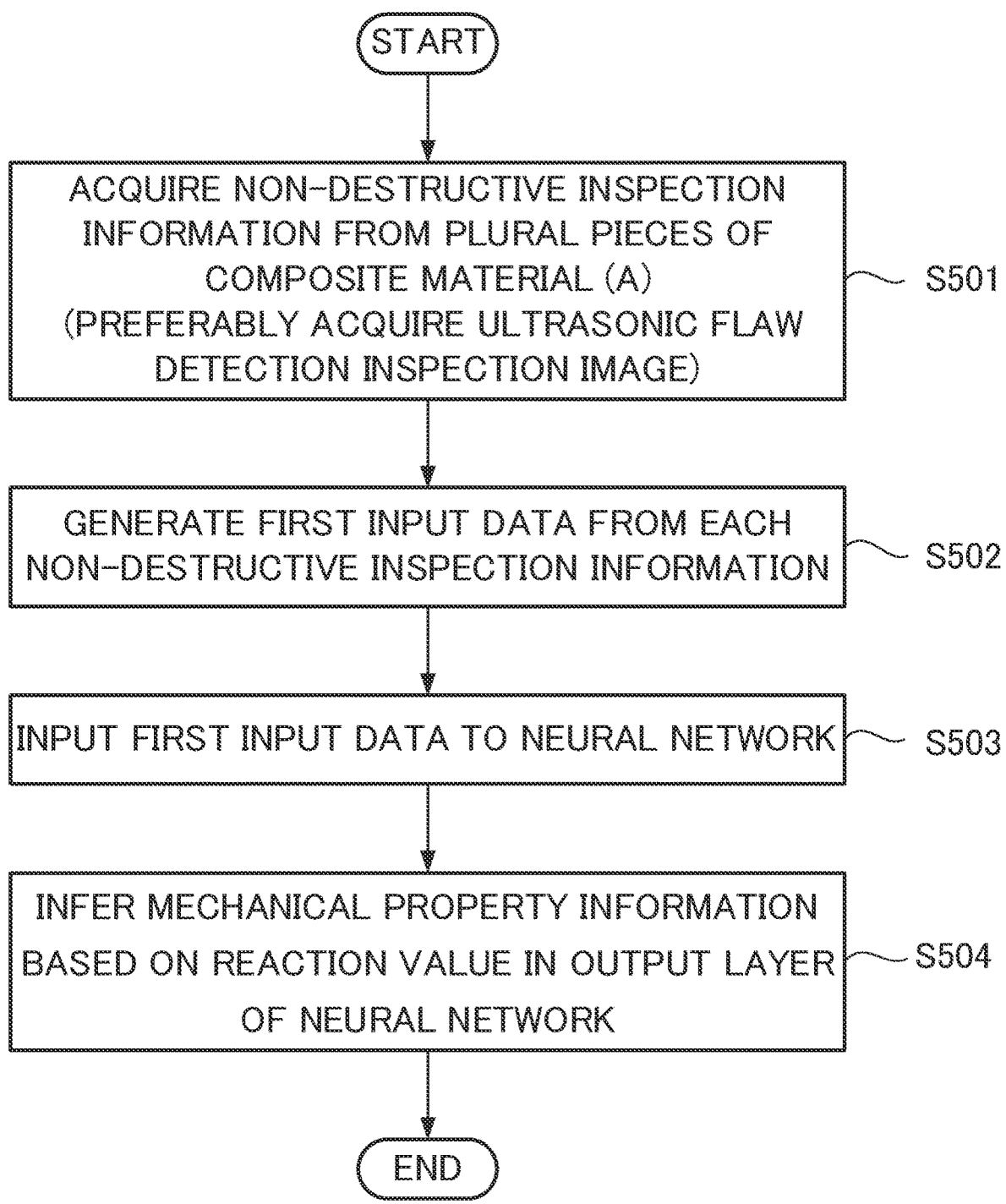
FIG. 5 is a flow chart of inference processing.

FIG. 5 is a flowchart for explaining an operation of inferring the mechanical property information by the inspection device 1 that operates according to the inspection program for the molded article region. The processor of the inspection device 1 acquires the nondestructive inspection information of the molded article region (a) (preferably takes an ultrasonic flaw detection inspection image) (step S501). When the ultrasonic flaw detection image is used as the nondestructive inspection information, there may be a step of performing image processing on the ultrasonic flaw detection image between steps S501 and S502.

Next, the processor of the inspection device 1 generates first input data from the nondestructive inspection information (step S502). The first input data includes N elements, in which N is equal to the number of units in the input layer of the neural network, and the first input data is in a format that can be input to the neural network.

Next, the processor of the inspection device 1 inputs the first input data to the neural network (step S503). The first input data is sent to the input layer, the hidden layer, and the output layer in order. The processor of the inspection device 1 predicts the mechanical property rank based on the reaction value of the output layer of the neural network (step S504).

Figure 6:
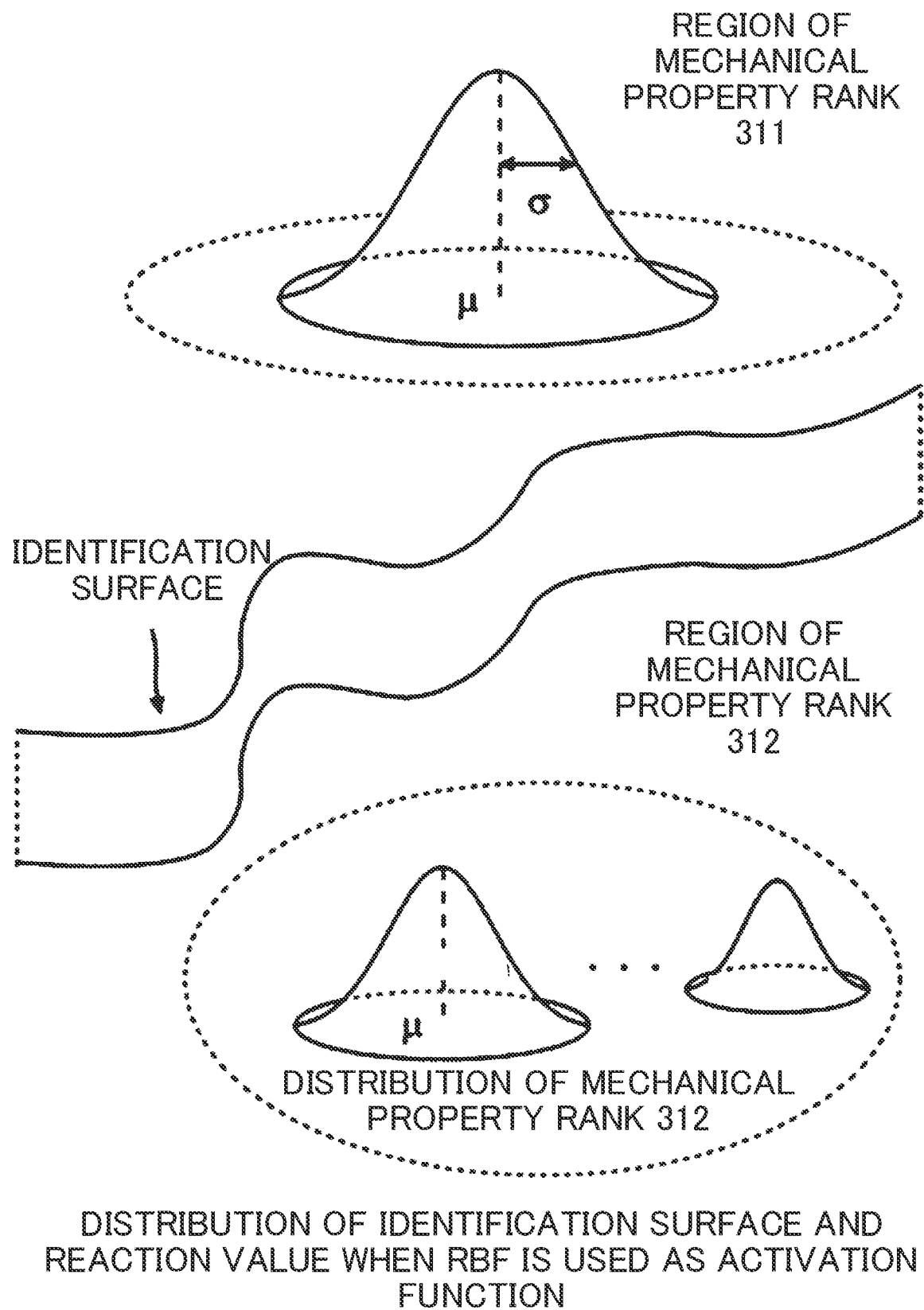
FIG. 6 is a diagram showing distribution of an identification surface and a reaction value when RBF is used as an activation function.

The inference process using the neural network is equivalent to process of finding a location of the first input data in an identification space. FIG. 6 shows an example of the identification space when the Gaussian function is used as the activation function. When the RBF such as the Gaussian function is used as the activation function, the identification surface that divides the identification space into regions for each rank of the mechanical properties becomes a closed surface. By adding an index in a height direction for each category of the mechanical property rank, the region related to each category in the identification space can be localized.

Figure 7:
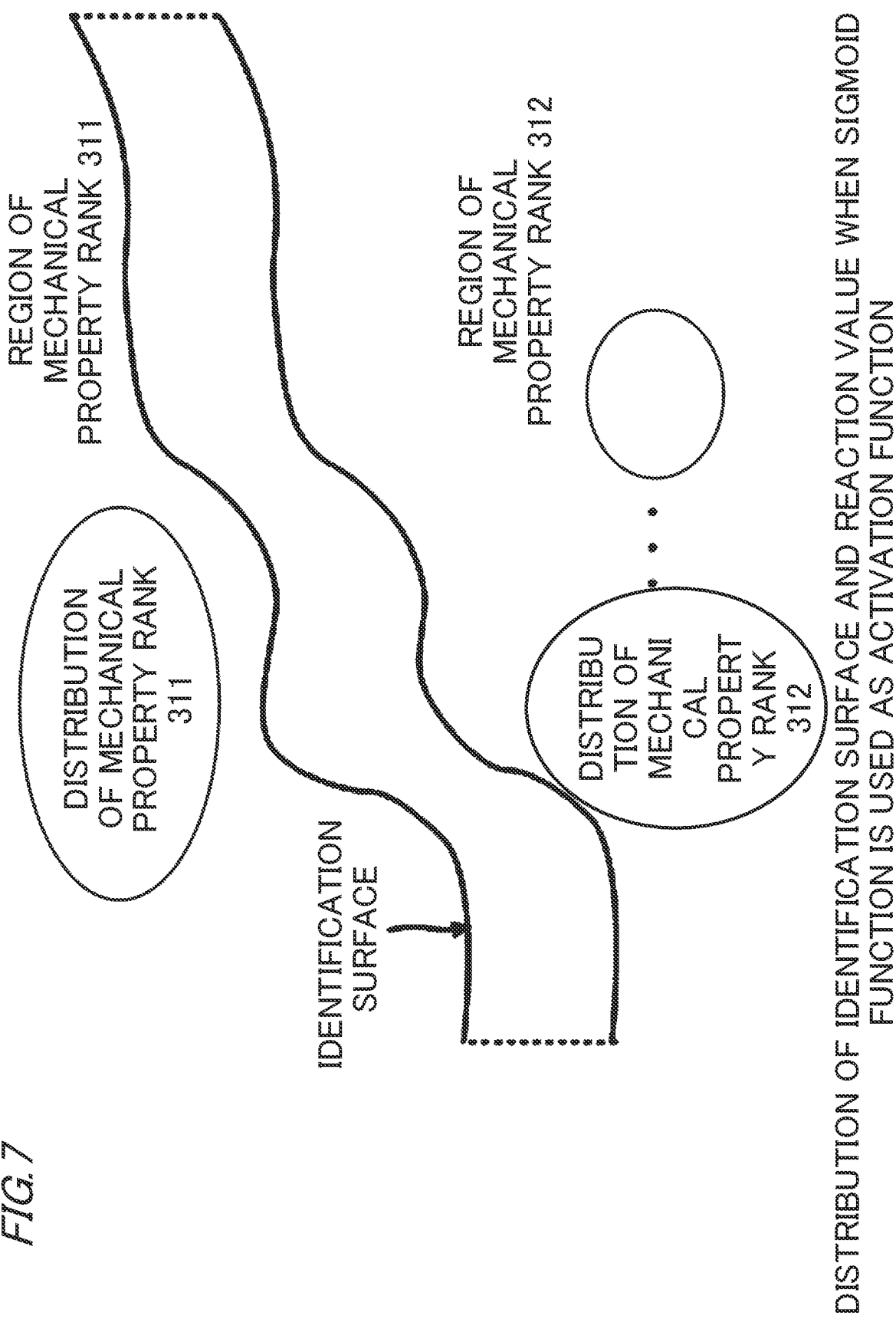
FIG. 7 is a diagram showing distribution of the identification surface and the reaction value when a sigmoid function is used as the activation function.
Figure 8A:
FIG. 8A is a schematic diagram showing an ultrasonic flaw detection inspection image.
Figure 8B:
FIG. 8B is a schematic diagram showing an ultrasonic flaw detection inspection image.
Figure 8C:
FIG. 8C is a schematic diagram showing an ultrasonic flaw detection inspection image.
Figure 8D:
FIG. 8D is a schematic diagram showing an ultrasonic flaw detection inspection image.

FIG. 7 shows an example of the identification space when the sigmoid function is used as the activation function. When the activation function is the sigmoid function, the identification surface is an open surface. The training process of the neural network corresponds to process of training the identification surface in the identification space. Although only the mechanical property rank 311 and the mechanical property rank 312 are shown in the regions in FIGS. 6 and 7, there may be a distribution of three or more mechanical property ranks.

As described above, by using the inspection system of the present embodiment, the mechanical property information of the molded article region (a) can be predicted from the nondestructive inspection information (preferably an ultrasonic flaw detection image) of the molded article region (a). The inventions described in Patent Literature 2 (WO2019/151393) and Patent Literature 3 (WO2019/151394) merely replace eye inspection for judging an image or an object to be measured with a neural network. That is, in these inventions, since the object to be inspected is a photographed food, a human can easily determine presence or absence of foreign matters and the like in the food.

In contrast, the mechanical property information is a numerical value or a rank equivalent thereto, and the nondestructive inspection information (preferably an ultrasonic flaw detection image) is a visualized or quantified internal state of the molded article region. In other words, even a skilled worker cannot predict the mechanical property information by looking at the nondestructive inspection information. For example, it is clear that no matter how hard humans try, it is not possible to predict the mechanical property information from the ultrasonic flaw detection images shown in FIGS. 8A to 8D. By using the inspection device 1 of the present embodiment, it is possible to instantly predict the mechanical property information that cannot be predicted by a skilled worker no matter how hard he or she tries, without actual measurement.

Next, an example of inferring the mechanical property information of the molded article region obtained by molding a plate-shaped composite material with a mold will be described. In the following, the plate-shaped composite material before being molded by the mold will be collectively referred to as a composite material MX. In the following description, a composite material M, a composite material Ms, a composite material M2, and a composite material M3 are exemplified as the composite material MX. The composite material MX preferably contains discontinuous fibers. The composite material MX is particularly preferably a sheet molding compound in which a thermosetting resin as a matrix resin is impregnated with a chopped fiber bundle mat.

[Method for Molding Composite Material MX]

The method for molding the composite material MX is not particularly limited, and press molding (compression molding), autoclave molding, vacuum molding, and the like are used, but the press molding is preferable.

[Mold]

FIG. 9 is a side view schematically showing an example of the mold used for press molding the composite material MX. FIG. 10 is a schematic plan view of a fixed die 20 in the mold shown in FIG. 9 as viewed from a movable mold 30 side. The mold shown in FIG. 9 includes the fixed mold 20 and the movable mold 30 that is movable with respect to the fixed mold 20. A recess 22 is formed on an upper surface 21 of the fixed mold 20 on the movable mold 30 side. The recess 22 is a region partitioned by a bottom surface 22A and a pair of side surfaces 22B connecting the bottom surface 22A and the upper surface 21. The movable mold 30 is movable in directions D including a direction D1 approaching the fixed mold 20 and a direction D2 away from the fixed mold 20. The direction D1 is a direction in which pressure is applied to the composite material MX when molding the composite material MX. When the molding method is vacuum molding, the direction D1 is a suction direction.

When the movable mold 30 is closest to the fixed mold 20 (the movable mold 30 is located at a position of an alternate long and short dash line in the drawing), a mold cavity (a space SP indicated by diagonal lines in the drawing) is formed between the movable mold 30 and the fixed mold 20.

The mold cavity is a space for forming a molded article. In the molded article obtained by molding the composite material MX with the mold, unnecessary portions at an end portion and the like may be trimmed. In this case, in the space SP shown in FIG. 9, a space for forming the molded article that finally remains after trimming is the mold cavity. For example, it is assumed that a portion shown by a broken line in a molded article MD1 shown in FIG. 13 obtained by molding the composite material M by the mold shown in FIG. 9 is trimmed to obtain a final product. In this case, a portion in the space SP excluding a range indicated by the broken line is the mold cavity.

Figure 11:
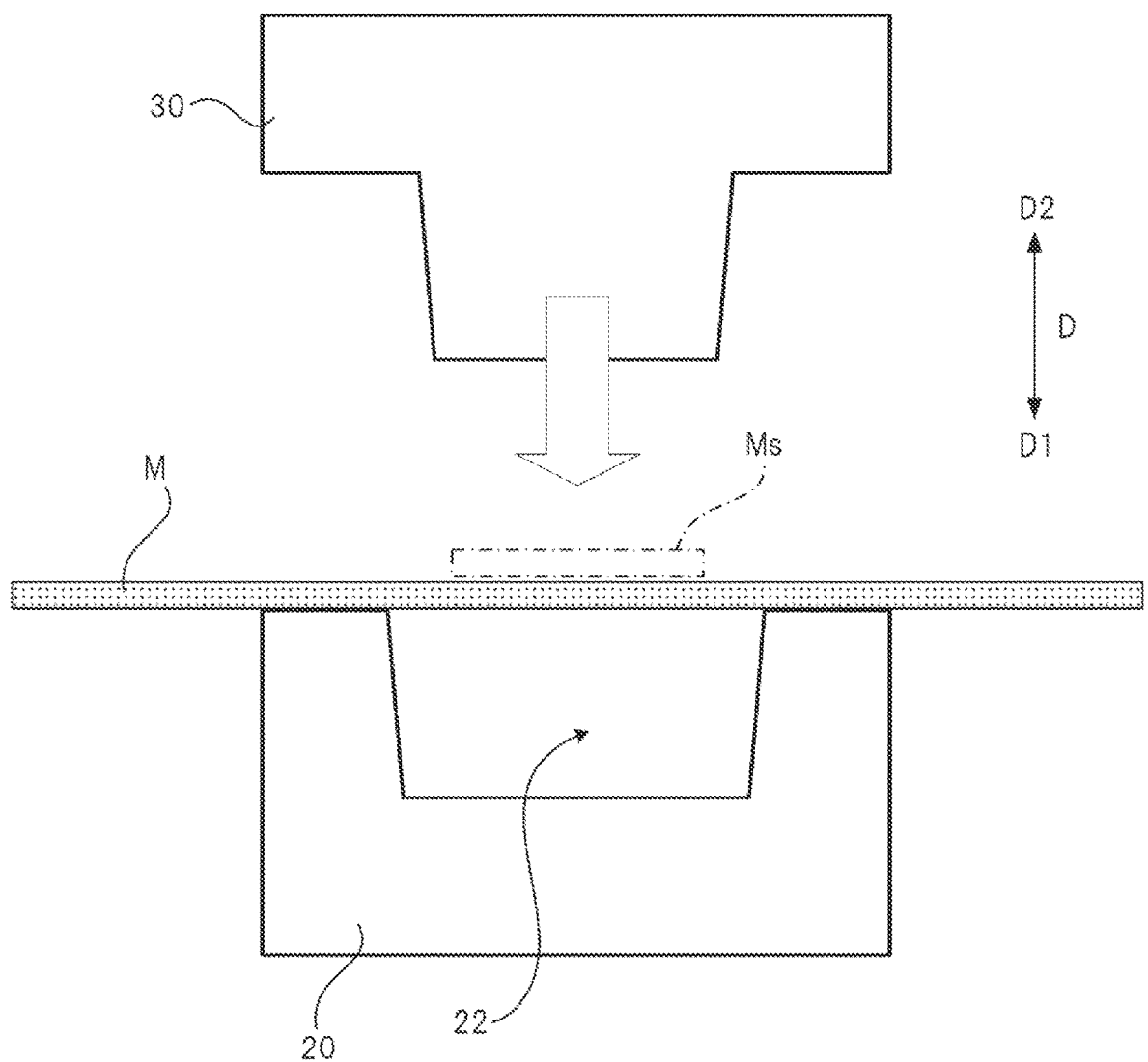
FIG. 11 is a schematic diagram showing an example of a method for molding a single piece of a composite material M by the mold shown in FIG. 9.
Figure 12:
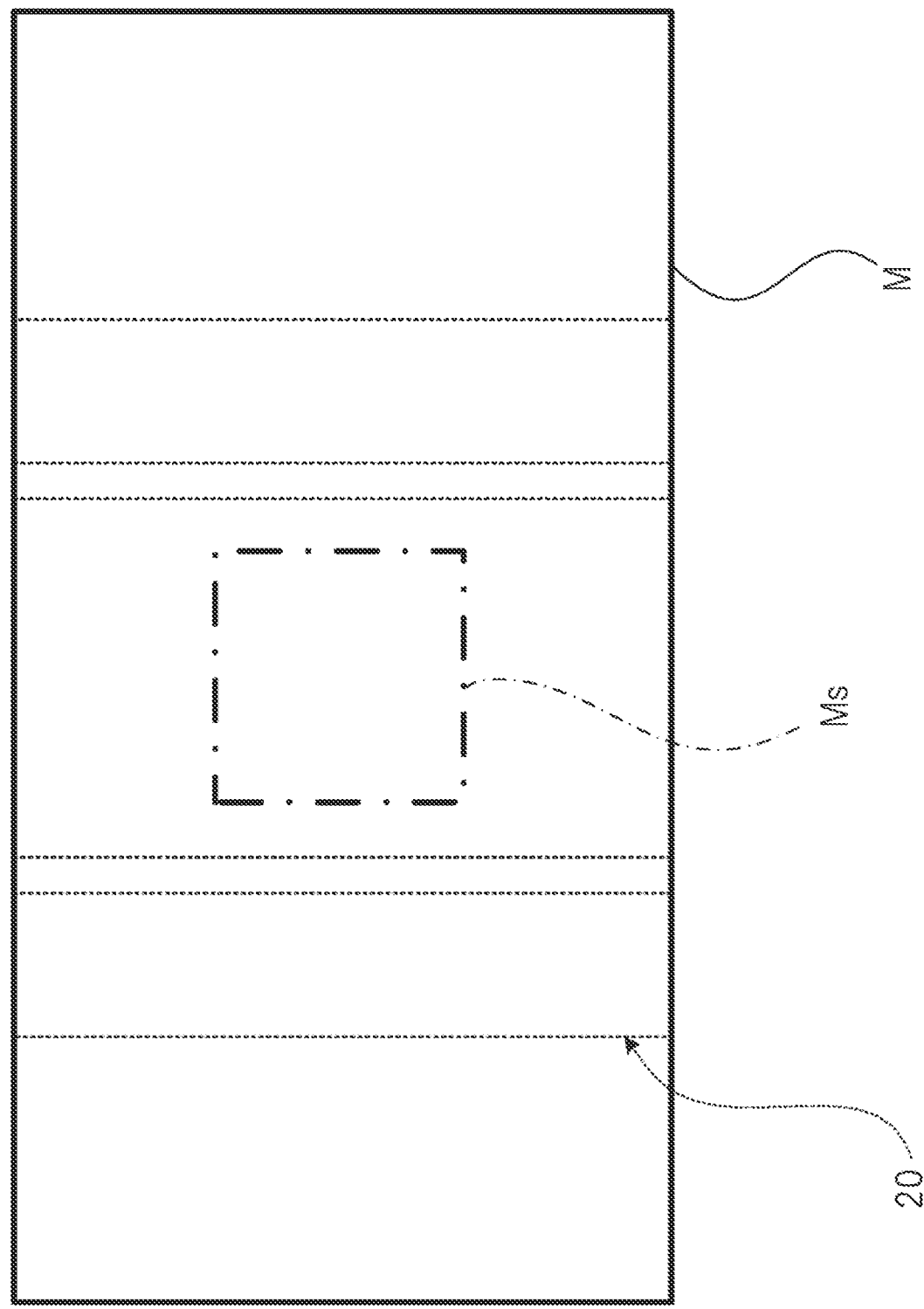
FIG. 12 is a schematic plan view of the fixed mold and the composite material M shown in FIG. 11 as viewed in a direction D1.
Figure 13:
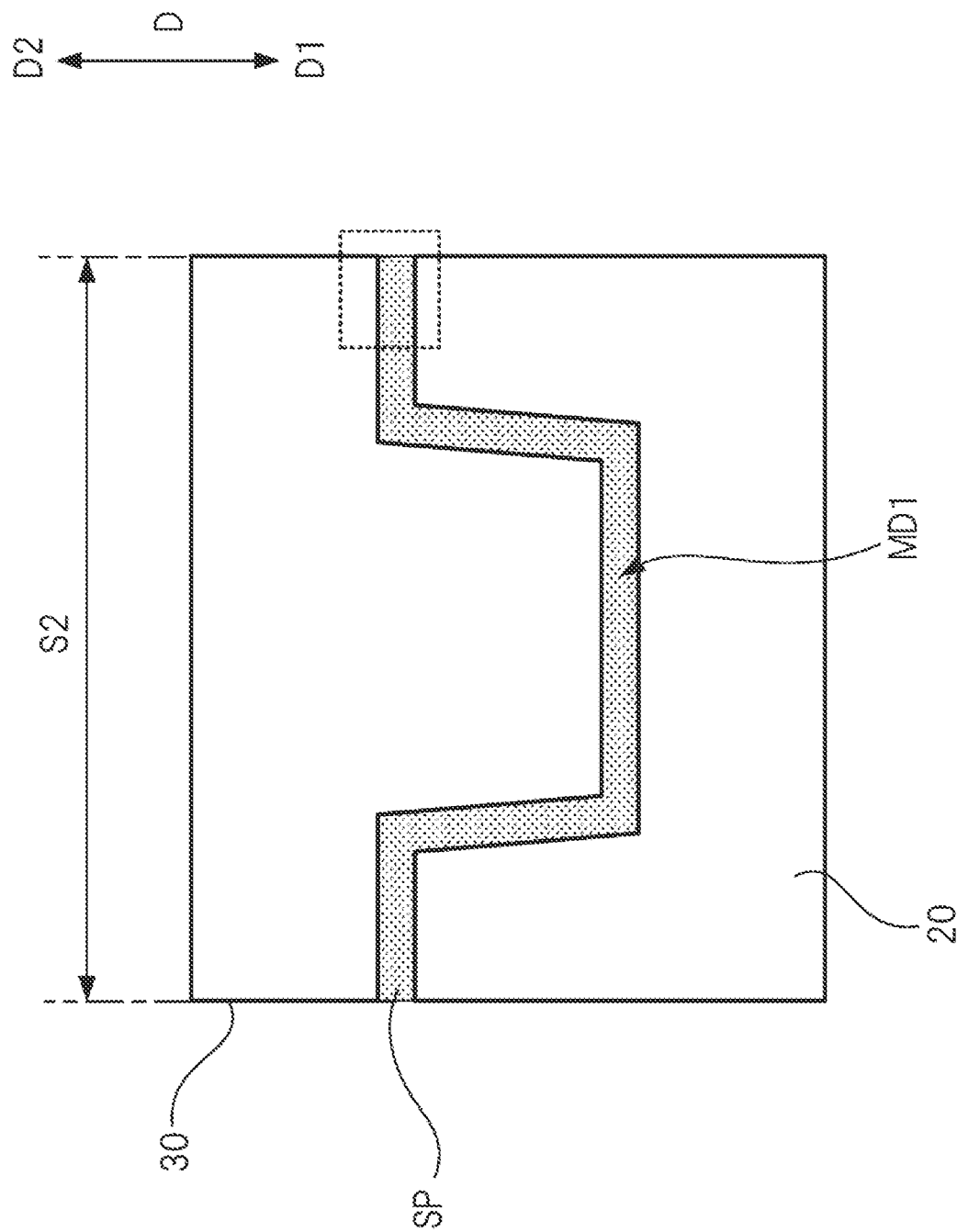
FIG. 13 is a schematic diagram showing a state in which the composite material M is molded by the mold shown in FIG. 9.

FIG. 11 is a schematic diagram showing an example of a method for molding a single piece of the composite material M by the mold shown in FIG. 9. The plate-shaped composite material M is arranged on the upper surface 21 of the fixed mold 20 so as to cover the recess 22. FIG. 12 is a schematic plan view of the fixed mold 20 and the composite material M shown in FIG. 11 as viewed in the direction D1. When the movable mold 30 is moved in the direction D1 from the state shown in FIG. 11, the composite material M flows by pressure from the movable mold 30 and is deformed along a shape of the space SP, so as to obtain the molded article MD1 as shown in FIG. 13. In the examples show % n in FIGS. 11 to 13, the entire molded article region obtained by molding the composite material M constitutes the molded article MD1.

Figure 14:
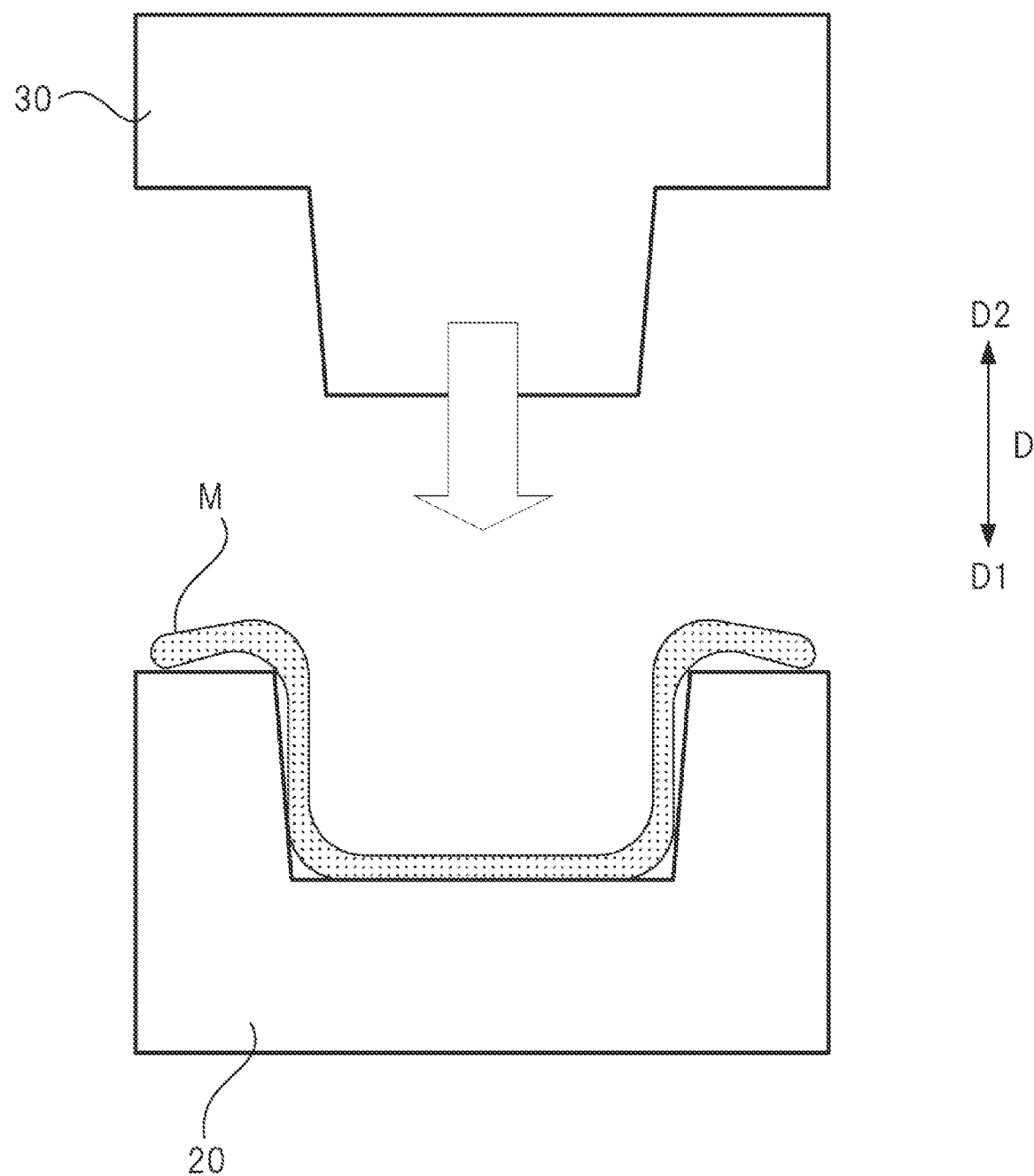
FIG. 14 is a schematic diagram showing an example in which the composite material M is heated to be pre-shaped and then disposed in the fixed mold.

When the molding method is cold pressing, the composite material M is heated before pressing to be pre-shaped. As shown in FIG. 14, the pre-shaped composite material M is arranged on the upper surface of the fixed mold 20 and the recess. Then, when the movable mold 30 is moved in the direction D1 from the state shown in FIG. 14, the pre-shaped composite material M flows by the pressure from the movable mold 30 and is deformed along the shape of the space SP, so as to obtain the molded article MD1 as shown in FIG. 13.

Figure 15:
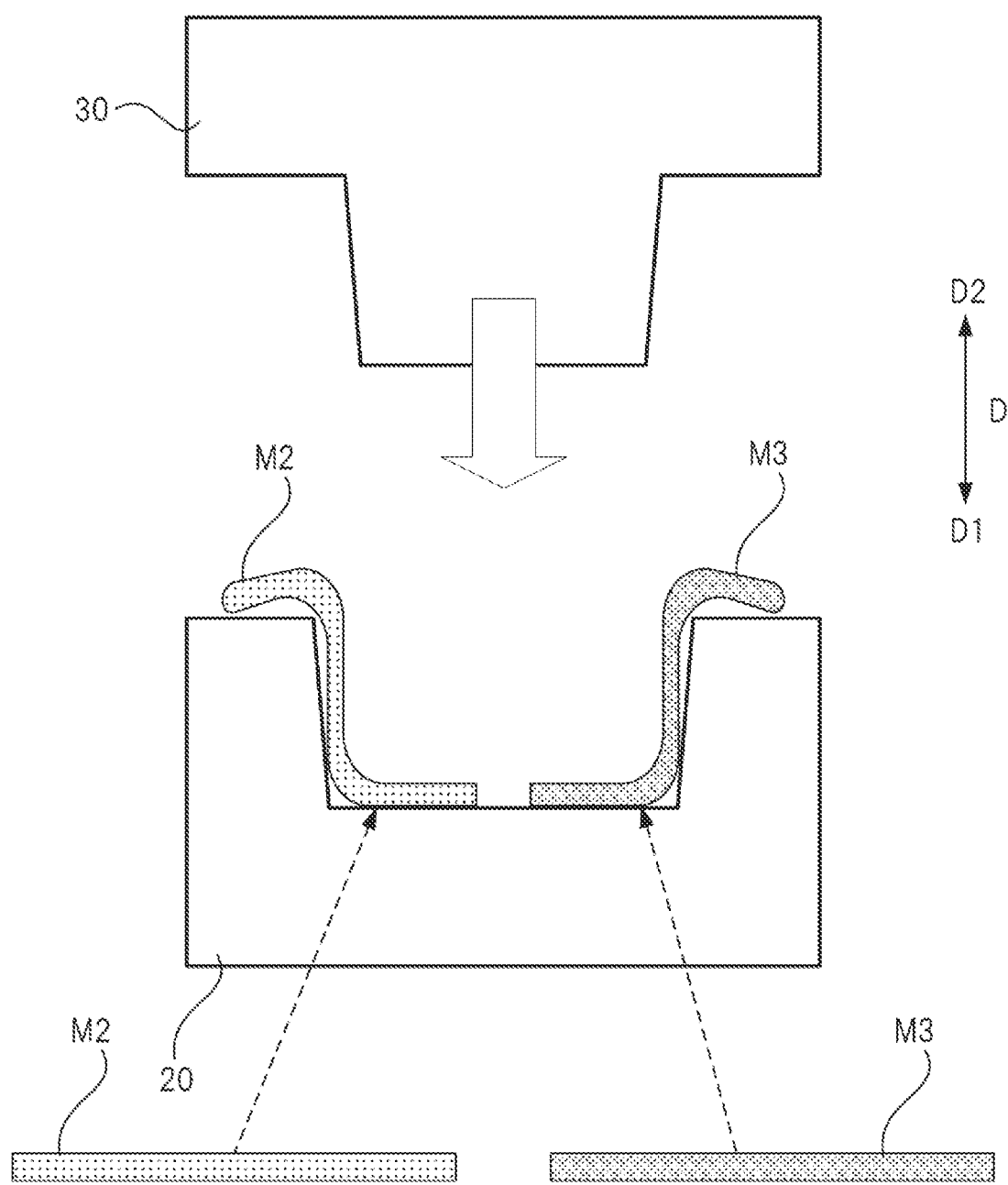
FIG. 15 is a schematic diagram showing an example in which plural pieces of the pre-shaped plate-shaped composite material are arranged on the fixed mold so as not to overlap each other, and then molded.
Figure 16:
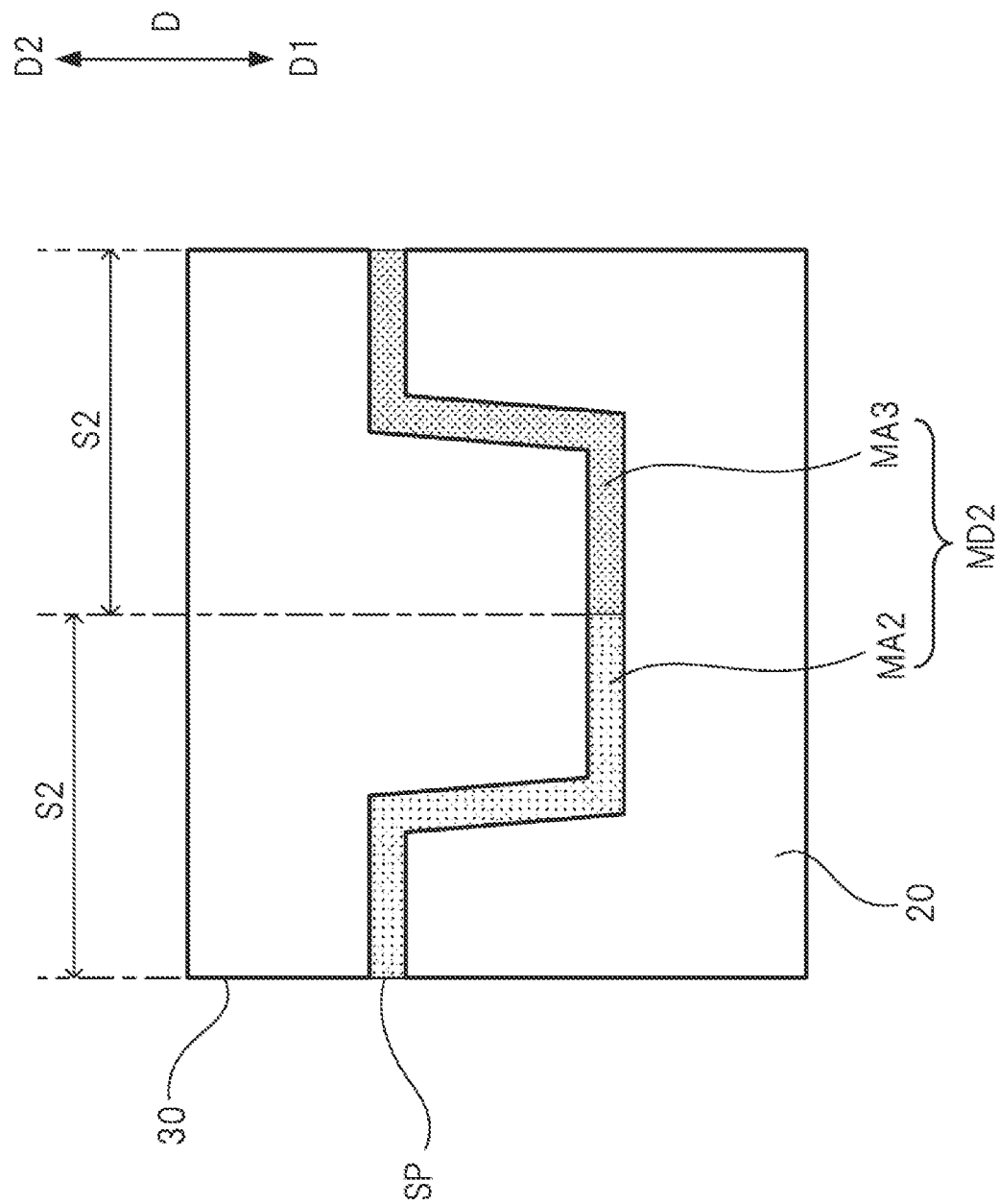
FIG. 16 is a schematic diagram showing a state in which the composite material is molded from the state shown in FIG. 15.

When the molded article is produced by the mold, the molded article may be made from one piece or plural pieces of the composite material MX. For example, as shown by the alternate long and short dash line in FIGS. 11 and 12, another plate-shaped composite material Ms may be placed on the composite material M before the molding. As shown in FIG. 15, plural pre-shaped plate-shaped composite materials (the composite material M2 and the composite material M3) may be arranged on the fixed mold 20 so as not to overlap each other before the molding. When the movable mold 30 is moved in the direction D1 from the state shown in FIG. 15, the pre-shaped composite material M2 and the composite material M3 flow by the pressure from the movable mold 30 and are deformed along the shape of the space SP. Then, as shown in FIG. 16, a molded article MD2 including a molded article region MA2 obtained by molding the composite material M2 and a molded article region MA3 obtained by molding the composite material M3 is obtained. In the examples shown in FIGS. 15 and 16, the molded article region MA2 obtained by molding the composite material M2 and the molded article region MA3 obtained by molding the composite material M3 each constitute a part of the molded article MD2.

[Projection Area S1 of Composite Material MX Constituting Molded Article]

When the molded article is constituted by the single piece of the composite material MX, a flat area of the composite material MX when the single piece of the composite material MX (before being pre-shaped when cold press molding is adopted) is viewed in a thickness direction is defined as a projection area S1. In the example of FIG. 1, the flat area of the composite material M is the projection area S1.

It is assumed that the molded article is constituted by plural pieces of the composite material MX and is molded in a state where the plurality of pieces of the composite material MX are laminated. In this case, the molded article is considered to be constituted by a single molded article region. Then, when the plurality of pieces of the composite material MX (before being pre-shaped when the cold press molding is adopted) are viewed in a thickness direction of each piece, a flat area of all the plurality of pieces of the composite material MX is defined as the projection area S1. In the example shown in FIG. 12, the entire composite material Ms overlaps the composite material M. Therefore, the projection area S1 is the same as the flat area of the composite material M. In FIG. 12, for example, it is assumed that only a part of the composite material Ms is arranged so as to overlap the composite material M. In this case, a sum of the flat area of the composite material M and the flat area of a region of the composite material Ms that does not overlap the composite material M is the projection area S1.

It is assumed that the molded article is constituted by plural pieces of the composite material MX, and the plurality of pieces of the composite material MX are arranged so as not to overlap each other before molding. In this case, when the plurality of pieces of the composite material MX (before being pre-shaped when the cold press molding is adopted) are viewed in the thickness direction of each piece, a flat area of each piece of the composite material IX is defined as the projection area S1. In the example shown in FIG. 15, when the composite material M2 before being pre-shaped is viewed in the thickness direction, a flat area of the composite material M2 is the projection area S1. When the composite material M3 before being pre-shaped is viewed in the thickness direction, a flat area of the composite material M3 is the projection area S1.

[Projection Area S2 of Portion Corresponding to Molded Article Region in Mold Cavity]

It is assumed that the molded article formed by the mold cavity is constituted by a single molded article region obtained by molding a single piece or plural overlapping pieces of the composite material MX. In this case, the entire mold cavity is a portion corresponding to the single molded article region. A flat area of this portion when viewed in the direction D1 is defined as the projection area S2. In the example shown in FIG. 13, a flat area of the space SP when viewed in the direction D1 is the projection area S2.

It is assumed that the molded article formed by the mold cavity is constituted by plural molded article regions obtained by molding plural pieces of the composite material MX arranged so as not to overlap each other. In this case, a portion of the mold cavity in which each molded article region exists is a portion corresponding to each molded article region. A flat area of each of these portions when viewed in the direction D1 is defined as the projection area S2.

In the example shown in FIG. 16, a flat area of a portion of the space SP in which the molded article region MA2 exists when viewed in the direction D1 is the projection area S2. A flat area of a portion of the space SP in which the molded article region MA3 exists when viewed in the direction D1 is the projection area S2.

When plural pieces of the composite material MX are arranged apart from each other and cold pressed to prepare the molded article, each piece of the composite material MX flows during molding and a weld is formed at a boundary. Therefore, by observing the completed molded article, the "molded article region obtained by molding each piece of the composite material MX" can be easily determined.

[Charge Rate]

A value obtained by calculation with the following Equation (C) is defined as a charge rate for the molded article produced by the mold.

Charge rate[%]=100×{(projection area $S1$ of composite material $MX$ constituting molded article)/(projection area $S2$ of portion corresponding to molded article region in mold cavity)}(C)

When the molded article includes plural molded article regions as in the example shown in FIG. 16, two charge rates can be obtained for one molded article by substituting the projection area S1 and the projection area S2 for each molded article region into Equation (C).

That is, a first charge rate is calculated with a flat area of the composite material M2 as the projection area S1 and a flat area of a portion in the mold cavity where the molded article region MA2 exists as the projection area S2. A second charge rate is calculated with a flat area of the composite material M3 as the projection area S1 and a flat area of a portion in the mold cavity where the molded article region MA3 exists as the projected area S2.

Figure 17:
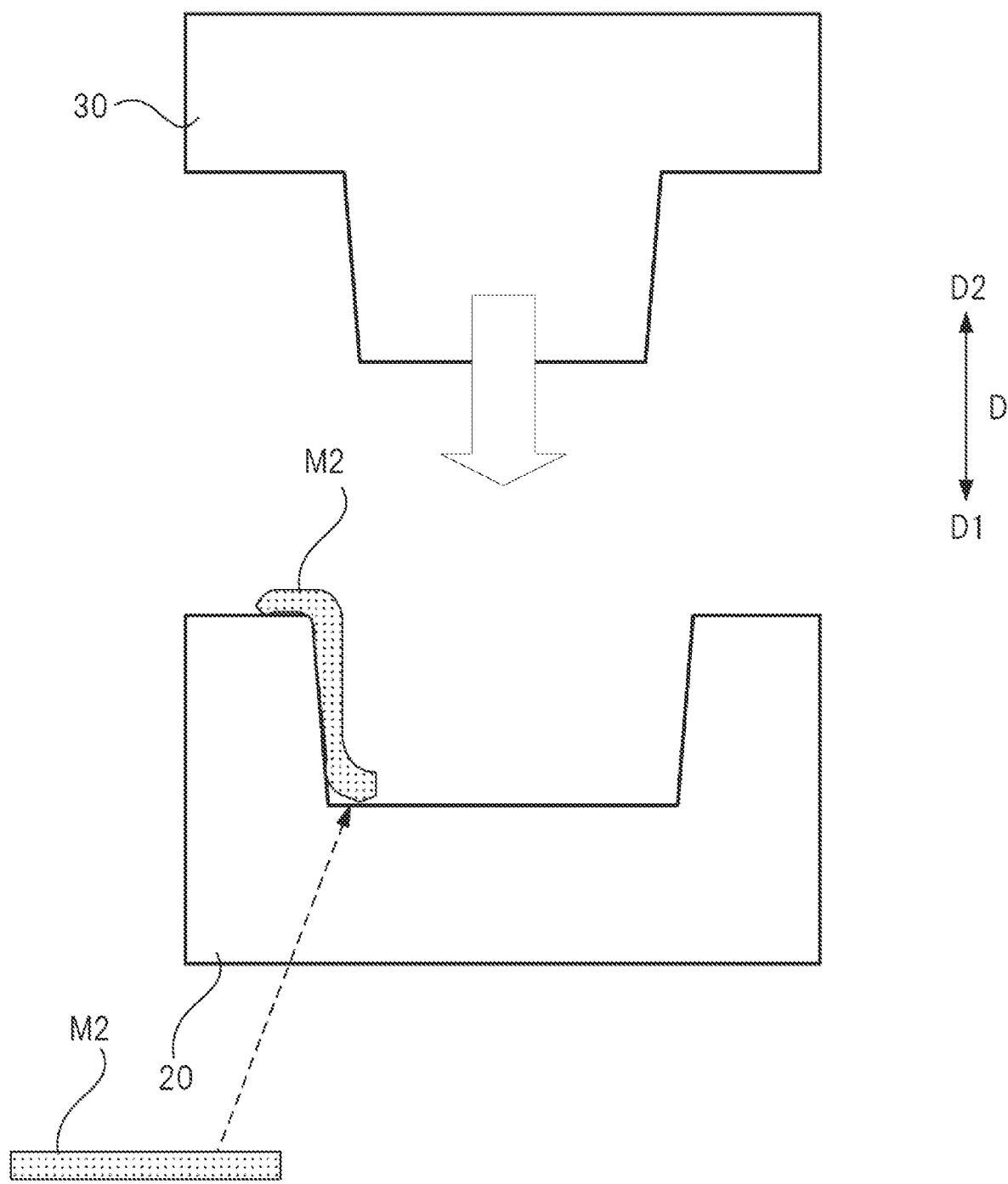
FIG. 17 is a schematic diagram for explaining a relation between a charge rate and a flow distance of the composite material.

The larger the charge rate, the smaller a flow distance of the composite material MX during the molding. For example, a case where only the molded article region MA2 shown in FIG. 16 is produced as a product by using the mold shown in FIG. 9 is taken as an example. In this case, as shown in FIG. 17, when the projection area S1 of the composite material M2 is made smaller than the example shown in FIG. 15 and the charge rate is lowered, the flow distance of the composite material M2 is longer than the example shown in FIG. 15.

In a case where the composite material MX contains discontinuous fibers and the molded article region obtained by molding the composite material MX is fiber-reinforced by the discontinuous fibers, when the composite material MX is flowed to generate the molded product region, the fibers are oriented at the same time as the composite material MX flows. Therefore, when the flow distance of the composite material MX is short, it becomes easy to control the flow and fiber orientation during the molding, and mechanical property quality of the molded article region when mass-produced is stable.

The above-mentioned mechanical property inference model can be generated by using the training data obtained in a state where the mechanical property quality of the molded article region is as stable as possible, so that the inference accuracy of the mechanical properties can be improved. Specifically, as the first molded article region, which is a measurement source of the training data (nondestructive inspection information and machine physical property information) to be learned by the mechanical property inference model, and the second molded article region whose mechanical properties are predicted by using the mechanical property inference model, it is preferable that those obtained by molding the composite material MX with a mold so that the charge rates thereof are 10% or more and 500% or less are applied.

As a structure of each of the first molded article region and the second molded article region, for example, the molded article MD1 shown in FIG. 13, the molded article region MA2 shown in FIG. 16, the molded article region MA3 shown in FIG. 16, or the molded article MD2 shown in FIG. 16 can be adopted. When each of the first molded article region and the second molded article region is the molded article MD2 shown in FIG. 16, it suffices that either one of the charge rate obtained for the composite material M2 and the molded article region MA2, and the charge rate obtained for the composite material M3 and the molded article region MA3 is 10% or more and 500% or less.

When the charge rate is less than 10% the flow distance of the composite material MX is large. Therefore, it is difficult to stabilize the mechanical property quality of each of the first molded article region and the second molded article region. Therefore, a lower limit of the charge rate is 10%. An upper limit of the charge rate can be determined depending on an application of the product manufactured by the mold. If the upper limit is set to 500%, a product suitable for many applications can be applied. In order to further stabilize the mechanical property quality of each of the first molded article region and the second molded article region, the charge rate is preferably 50% or more, more preferably 70% or more, and even more preferably 80% or more. When the reinforcing fibers are discontinuous fibers and a mechanical strength in a specific direction is desired to be improved, the charge rate is preferably 10% or more and less than 50% so that anisotropy is likely to occur in the molded article region.

[Isotropy of Molded Article Region]

When the flow of the composite material MX during the molding is small, fiber orientations of the composite material MX and the molded article region after molding are similar to each other. Particularly, in the case of an isotropic base material in which the composite material MX is reinforced with discontinuous fibers, isotropy is ensured even in the molded article region if the flow during the molding is small (in other words, if the charge rate is large). Therefore, the isotropy of the first molded article region and the second molded article region are preferably 1.5 or less, and more preferably 1.3 or less.

[Coefficient of Variation (CV) of Basis Weight in Molded Article Region]

The coefficient of variation (CV) of basis weight of each of the first molded article region and the second molded article region is preferably 10% or less. When the coefficient of variation (CV) of basis weight is 10% or less, physical properties of the first molded article region and the second molded article region are made uniform. Therefore, it becomes easy to predict the mechanical properties by the mechanical property inference model.

[Reinforcing Fibers Contained in Molded Article Region]

It is preferable that both the first molded article region and the second molded article region contains a reinforcing fiber bundle A in which Li is 1 mm or more and 100 mm or less, and $Li/(Ni \times Di^2)$ is $8.0 \times 10^1$ or more and $3.3 \times 10^3$ or less, in which Li is a fiber length of a reinforcing fiber bundle, Di is a single fiber diameter of reinforcing fibers constituting the reinforcing fiber bundle, and Ni is the number of single fibers contained in the reinforcing fiber bundle.

A volume ratio of the reinforcing fiber bundle A is preferably 50 vol % to 100 vol %, more preferably 70 vol % to 90 vol %, based on the entire reinforcing fibers contained in the molded article.

Although various embodiments have been described above with reference to the drawings, it is needless to say that the present invention is not limited to such examples. It is apparent to those skilled in the art that various changes and modifications can be conceived within the scope of the claims, and it is also understood that such variations and modifications belong to the technical scope of the present invention. In addition, constituent elements in the embodiments described above may be combined freely within a range not departing from the spirit of the present invention.

The present application is based on a Japanese Patent Application No. 2020-118107 filed on Jul. 8, 2020, the contents of which are incorporated herein by reference.

REFERENCE SIGNS LIST

11: image storage unit
12: processing unit
13: input data generation unit
14: training data storage unit
15: training unit
16: model storage unit
17: inference unit
18: display unit
19: operation unit
301: neural network
302: input layer
303: hidden layer
304: output layer
311, 312, 313: unit

The invention claimed is:

1. A non-transitory computer readable medium storing an inspection program for a molded article region, the inspection program causing a processor to execute:

a step of performing machine learning of mechanical property information and nondestructive inspection information of a fiber-reinforced first molded article region, and generating a mechanical property inference model in which nondestructive inspection information of a fiber-reinforced second molded article region is input for inferring unknown mechanical property information of the second molded article region;

a step of acquiring the nondestructive inspection information of the second molded article region; and a step of inputting the acquired nondestructive inspection information into the mechanical property inference model, acquiring the mechanical property information of the second molded article region from the mechanical property inference model, and performing output based on the mechanical property information, wherein the first molded article region and the second molded article region are both obtained by molding a plate-shaped composite material with a mold, and the first molded article region and the second molded article region are both obtained by molding the composite material such that a charge rate is 10% or more and 500% or less, wherein the charge rate is a value obtained by calculating $(S1/S2) \times 100$, wherein S1 is a projection area of the composite material, and S2 is a projection area of a portion corresponding to each of the first molded article region and the second molded article region in a mold cavity of the mold.

2. The non-transitory computer readable medium according to claim 1, wherein
each of the first molded article region and the second molded article region is obtained by molding the composite material such that the charge rate is 50% or more.

3. The non-transitory computer readable medium according to claim 1, wherein
each of the first molded article region and the second molded article region is fiber-reinforced with discontinuous fibers.

4. The non-transitory computer readable medium according to claim 1, wherein
each of the first molded article region and the second molded article region has an isotropy of 1.5 or less.

5. The non-transitory computer readable medium according to claim 1, wherein
each of the first molded article region and the second molded article region has a coefficient of variation of basis weight of 10% or less.

6. The non-transitory computer readable medium according to claim 1, wherein
reinforcing fibers contained in the first molded article region and the second molded article region contain reinforcing fiber bundle in which Li is 1 mm or more and 100 mm or less, and $Li/(Ni \times Di^2)$ is $8.0 \times 10^1$ or more and $3.3 \times 10^3$ or less,
wherein Li is a fiber length of a reinforcing fiber bundle, Di is a single fiber diameter of reinforcing fibers constituting the reinforcing fiber bundle, and Ni is the number of single fibers contained in the reinforcing fiber bundle.

7. The non-transitory computer readable medium according to claim 1, wherein
the molding is press molding.

8. The non-transitory computer readable medium according to claim 1, wherein
the composite material is a sheet molding compound in which a thermosetting resin as a matrix resin is impregnated with a chopped fiber bundle mat.

9. The non-transitory computer readable medium according to claim 1, wherein
the nondestructive inspection information is an image or numerical data.

10. The non-transitory computer readable medium according to claim 1, wherein
the mechanical property information is information on elastic modulus or breaking strength of the molded article region.

11. The non-transitory computer readable medium according to claim 10, wherein
the information on elastic modulus includes elastic modulus or a rank when the elastic modulus is ranked, and
the information on breaking strength includes breaking strength or a rank when the breaking strength is ranked.

12. The non-transitory computer readable medium according to claim 11, wherein
the information on elastic modulus or breaking strength includes at least one kind of information indicating that the elastic modulus or breaking strength is difficult to infer, information indicating that the elastic modulus or breaking strength corresponds to a defective product, and information indicating that the elastic modulus or breaking strength corresponds to a non-defective product.

13. An inspection method for a molded article region, comprising:
a step of performing machine learning of mechanical property information and nondestructive inspection information of a fiber-reinforced first molded article region, and generating a mechanical property inference model in which nondestructive inspection information of a fiber-reinforced second molded article region is input for inferring unknown mechanical property information of the second molded article region;
a step of acquiring the nondestructive inspection information of the second molded article region; and
a step of inputting the acquired nondestructive inspection information into the mechanical property inference model, acquiring the mechanical property information of the second molded article region from the mechanical property inference model, and performing output based on the mechanical property information, wherein
the first molded article region and the second molded article region are both obtained by molding a plate-shaped composite material with a mold, and
the first molded article region and the second molded article region are both obtained by molding the composite material such that a charge rate is 10% or more and 500% or less,
wherein the charge rate is a value obtained by calculating (S1/S2)×100,
wherein S1 is a projection area of the composite material, and S2 is a projection area of a portion corresponding to each of the first molded article region and the second molded article region in a mold cavity of the mold.

14. An inspection device for a molded article region, comprising:
a processor capable of accessing a model storage unit that stores a mechanical property inference model generated by machine learning based on mechanical property information and nondestructive inspection information of a fiber-reinforced first molded article region, wherein
the mechanical property inference model is configured to be input nondestructive inspection information of a second molded article region for inferring unknown mechanical property information of the second molded article region,
the first molded article region and the second molded article region are both obtained by molding a plate-shaped composite material with a mold, and
the first molded article region and the second molded article region are both obtained by molding the composite material such that a charge rate is 10% or more and 500% or less,
wherein the charge rate is a value obtained by calculating (S1/S2)×100,
wherein S1 is a projection area of the composite material, and S2 is a projection area of a portion corresponding to each of the first molded article region and the second molded article region in a mold cavity of the mold, and
the processor is configured to acquire the nondestructive inspection information of the second molded article region, input the nondestructive inspection information into the mechanical property inference model, acquire the mechanical property information of the second molded article region from the mechanical property inference model, and perform output the mechanical property information of the second molded article region.

* * * * *